(12) United States Patent
Yamashita

(10) Patent No.: US 10,316,922 B2
(45) Date of Patent: Jun. 11, 2019

(54) SHOCK ABSORBER

(71) Applicant: HITACHI AUTOMOTIVE SYSTEMS, LTD., Ibaraki (JP)

(72) Inventor: Mikio Yamashita, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/759,426

(22) PCT Filed: Sep. 14, 2016

(86) PCT No.: PCT/JP2016/077073
§ 371 (c)(1),
(2) Date: Mar. 12, 2018

(87) PCT Pub. No.: WO2017/047623
PCT Pub. Date: Mar. 23, 2017

(65) Prior Publication Data
US 2018/0259029 A1 Sep. 13, 2018

(30) Foreign Application Priority Data
Sep. 14, 2015 (JP) ................. 2015-181065

(51) Int. Cl.
*F16F 9/34* (2006.01)
*F16F 9/348* (2006.01)
*F16F 9/512* (2006.01)

(52) U.S. Cl.
CPC .......... *F16F 9/3488* (2013.01); *F16F 9/3415* (2013.01); *F16F 9/5126* (2013.01); *F16F 2222/12* (2013.01); *F16F 2234/02* (2013.01)

(58) Field of Classification Search
CPC .... F16F 9/32; F16F 9/348; F16F 9/369; F16F 9/3488; F16F 9/363; F16F 9/46
(Continued)

(56) References Cited

U.S. PATENT DOCUMENTS 5,150,775 A 9/1992 Charles et al.
5,860,497 A 1/1999 Takahashi
(Continued)

FOREIGN PATENT DOCUMENTS

JP 2011-158019 8/2011
JP 2011-179546 9/2011
(Continued)

OTHER PUBLICATIONS

International Search Report dated Dec. 6, 2016 in International Application No. PCT/JP2016/077073.

*Primary Examiner* — Christopher P Schwartz
(74) *Attorney, Agent, or Firm* — Wenderoth, Lind & Ponack, L.L.P.

(57) ABSTRACT

A shock absorber includes a bottomed cylindrical housing (131), a disk (134) provided movably relative to the housing and forming a housing inner chamber (171) between a bottom portion of the housing and the disk, and a facing member (139) provided on an opposite side of the disk from the bottom portion so as to face the disk. Inner periphery sides of the housing and the facing member are fastened with a piston rod (21) inserted therethrough. A protruding portion is formed on the bottom portion of the housing or the facing member. The protruding portion protrudes toward the disk and is configured to restrict movement of the disk. A seal portion (158) is provided on one side of the disk where the protruding portion is provided. The seal portion is configured to seal between an outer periphery of the disk and an inner periphery of the housing.

8 Claims, 9 Drawing Sheets

(58) Field of Classification Search
USPC .............. 188/282.2, 282.5, 282.6, 313, 315
See application file for complete search history.

(56) References Cited

U.S. PATENT DOCUMENTS

| | | | | |
|---|---|---|---|---|
| 2004/0069581 | A1* | 4/2004 | Shinata | F16F 9/3405 188/322.15 |
| 2008/0236966 | A1* | 10/2008 | Yamaguchi | F16F 9/465 188/275 |
| 2011/0186393 | A1* | 8/2011 | Maeda | F16F 9/3488 188/280 |
| 2011/0209956 | A1* | 9/2011 | Maeda | F16F 9/3488 188/322.13 |
| 2011/0290603 | A1 | 12/2011 | Yabe | |
| 2014/0238796 | A1* | 8/2014 | Yamashita | F16F 9/5126 188/271 |
| 2014/0252735 | A1* | 9/2014 | Yamashita | F16F 9/342 280/6.157 |
| 2014/0353099 | A1* | 12/2014 | Yamashita | F16F 9/3485 188/314 |
| 2015/0041265 | A1* | 2/2015 | Yamashita | F16F 9/18 188/315 |
| 2015/0204412 | A1* | 7/2015 | Yamashita | F16F 9/363 188/271 |
| 2015/0275999 | A1* | 10/2015 | Mori | F16F 9/18 188/313 |
| 2016/0061284 | A1* | 3/2016 | Yamashita | F16F 9/369 188/313 |
| 2017/0080767 | A1* | 3/2017 | Yamashita | F16F 9/34 |
| 2018/0216690 | A1* | 8/2018 | Yamashita | F16F 9/348 |
| 2018/0245660 | A1* | 8/2018 | Yamashita | F16F 9/34 |

FOREIGN PATENT DOCUMENTS

| | | |
|---|---|---|
| JP | 2011-247371 | 12/2011 |
| JP | 2014-231879 | 12/2014 |

* cited by examiner

SHOCK ABSORBER

TECHNICAL FIELD

The present invention relates to a shock absorber.

BACKGROUND ART

Some of shock absorbers are provided with a rod acceleration reduction mechanism on a bottom valve to prevent or reduce generation of abnormal noise (for example, refer to PTL 1).

CITATION LIST

Patent Literature

PTL 1: Japanese Patent Application Public Disclosure No. 2011-247371

SUMMARY OF INVENTION

Technical Problem

Then, the shock absorbers are required to be reduced in size.

Therefore, an object of the present invention is to provide a shock absorber capable of being reduced in size.

Solution to Problem

To achieve the above-described object, the present invention includes a bottomed cylindrical housing, a disk provided movably relative to the housing and forming a housing inner chamber between a bottom portion of the housing and the disk, and an annular facing member provided on an opposite side of the disk from the bottom portion so as to face the disk. Inner periphery sides of the housing and the facing member are fastened with a pin member inserted therethrough. A protruding portion is formed on the bottom portion of the housing or the facing member. The protruding portion protrudes toward the disk and is configured to restrict a movement of the disk. A seal portion is provided on one side of the disk where the protruding portion is provided. The seal portion is configured to seal between an outer periphery of the disk and an inner periphery of the housing.

Advantageous Effects of Invention

According to the present invention, the shock absorber can be reduced in size.

DESCRIPTION OF EMBODIMENTS

[First Embodiment]

Figure 1:
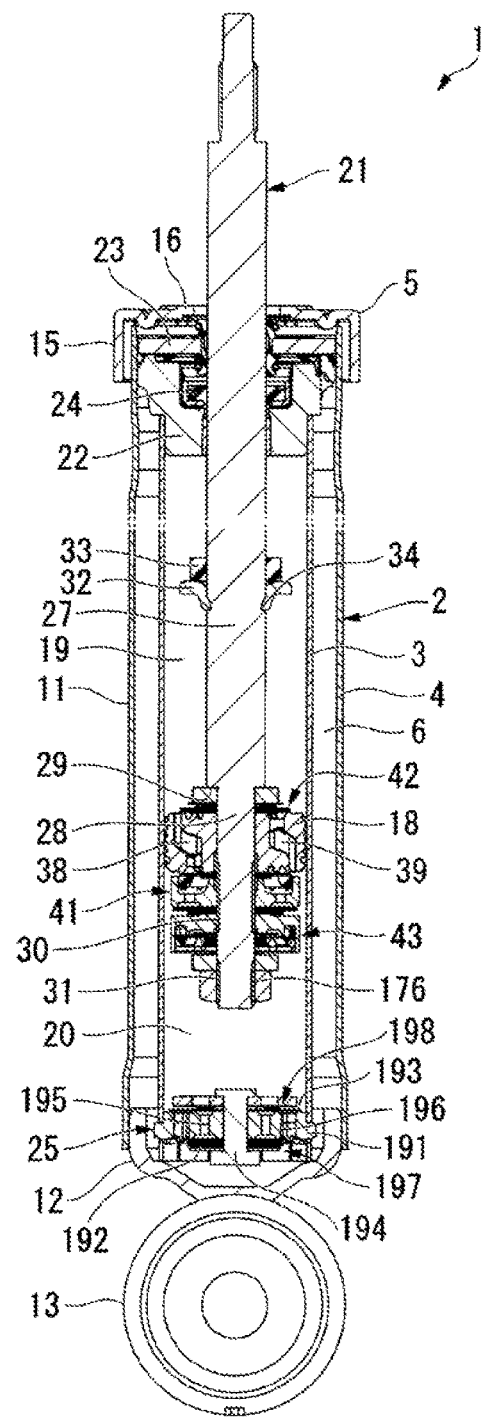
FIG. 1 is a cross-sectional view illustrating a shock absorber according to a first embodiment of the present invention

A first embodiment of the present invention will be described with reference to FIGS. 1 to 4. In the following description, the first embodiment will be described referring to an upper side of the drawing as an upper side and a lower side of the drawing as a lower side for convenience of the description.

As illustrated in FIG. 1, a shock absorber 1 according to the first embodiment is a so-called twin-tube hydraulic shock absorber, and includes a cylinder 2 sealingly containing oil fluid as hydraulic fluid therein. The cylinder 2 includes a cylindrical inner tube 3, a bottomed cylindrical outer tube 4, and a cover 5. The outer tube 4 is larger in diameter than the inner tube 3, and is provided concentrically on an outer peripheral side so as to cover the inner tube 3. The cover 5 covers an upper opening side of the outer tube 4. A reservoir chamber 6 is formed between the inner tube 3 and the outer tube 4.

The outer tube 4 includes a cylindrical barrel member 11 and a bottom member 12. The bottom member 12 is fittedly fixed to a lower portion side of the barrel member 11, and closes a lower portion of the barrel member 11. A mounting eye 13 is fixed to the bottom member 12 on an outer side opposite from the barrel member 11.

The cover 5 includes a tubular portion 15 and an inner flange portion 16. The inner flange portion 16 extends from an upper end side of the tubular portion 15 radially inwardly. The cover 5 is placed over the barrel member 11 so as to cover an upper-end opening portion of the barrel member 11 with the inner flange portion 16 and to cover an outer peripheral surface of the barrel member 11 with the tubular portion 15, and, in this state, is fixed to the barrel member 11 with a part of the tubular portion 15 swaged radially inwardly.

A piston 18 is slidably fittedly inserted in the inner tube 3 of the cylinder 2. The piston 18 defines an upper chamber 19 and a lower chamber 20 in the inner tube 3. The oil fluid as the hydraulic fluid is sealingly contained in the upper chamber 19 and the lower chamber 20 in the inner tube 3, and the oil fluid as the hydraulic fluid and gas are sealingly contained in the reservoir chamber 6 between the inner tube 3 and the outer tube 4.

One end side of a piston rod 21 is inserted in the cylinder 2, and the piston 18 is coupled with this one end side. In other words, the one end side of the piston rod 21 is fixed to the piston 18 in the cylinder 2. The piston 18 and the piston rod 21 integrally move. The piston 18 will move toward an upper chamber 19 side during an extension stroke in which the piston rod 21 increases an amount protruding from the cylinder 2, and the piston 18 will move toward a lower chamber 20 side during a compression stroke in which the piston rod 21 reduces the amount protruding from the cylinder 2. The upper chamber 19 is a rod-side chamber located on a piston rod 21 side of the piston 18, and the lower chamber 20 is a bottom-side chamber located on a bottom member 12 side, i.e., a bottom side of the piston 18.

A rod guide 22 is fitted to upper-end opening sides of the inner tube 3 and the outer tube 4, and a seal member 23 is attached to the outer tube 4 on an upper side that is an outer side of the cylinder 2 with respect to the rod guide 22. A frictional member 24 is provided between the rod guide 22 and the seal member 23. All the rod guide 22, the seal member 23, and the frictional member 24 are annular, and the piston rod 21 is slidably inserted in respective inner sides of these rod guide 22, frictional member 24, and seal member 23 to extend out of the cylinder 2. In other words, the piston rod 21 has the one end side fixed to the piston 18 in the cylinder 2, and the other end side protruding out of the cylinder 2 via the rod guide 22 and the seal member 23.

Now, the rod guide 22 supports the piston rod 21 axially movably while restricting a radial movement thereof, and guides the movement of the piston rod 21. The seal member 23 is in close contact with the outer tube 4 on an outer peripheral portion thereof and is in sliding contact with an outer peripheral portion of the axially moving piston rod 21 on an inner peripheral portion thereof, thereby preventing the oil fluid in the inner tube 3 and the high-pressure gas and the oil fluid in the reservoir chamber 6 in the outer tube 4 from leaking outward. The frictional member 24 is in sliding contact with the outer peripheral portion of the piston rod 21 on an inner peripheral portion thereof, thereby generating frictional resistance on the piston rod 21. The frictional member 24 is not provided for the purpose of sealing.

An outer peripheral portion of the rod guide 22 has a stepped shape having a lower portion and an upper portion larger in diameter than the lower portion, and is fitted to an inner peripheral portion of the upper end of the inner tube 3 at the small-diameter lower portion thereof and fitted to an inner peripheral portion of the upper portion of the outer tube 4 at the large-diameter upper portion thereof. A bottom valve 25, which defines the lower chamber 20 and the reservoir chamber 6, is set on the bottom member 12 of the outer tube 4, and an inner peripheral portion of a lower end of the inner tube 3 is fitted to the bottom valve 25. The upper end portion of the outer tube 4 is swaged radially inwardly at a not-illustrated part thereof, and the swaged portion and the rod guide 22 sandwich the seal member 23 therebetween.

The piston rode 21 includes a main shaft portion 27 and an attachment shaft portion 28 smaller in diameter than the main shaft portion 27. The attachment shaft portion 28 is disposed in the cylinder 2, and the piston 18 and the like are attached thereto. An end portion of the main shaft portion 27 on an attachment shaft portion 28 side thereof forms a shaft stepped portion 29 extending in a direction orthogonal to an axis. An axially extending passage groove 30 is formed at an axially intermediate position on an outer peripheral portion of the attachment shaft portion 28, and a male screw 31 is formed at a distal end position axially opposite from the main shaft portion 27. The passage groove 30 is formed so as to have any one of a rectangular shape, a square shape, and a D-like shape in cross section taken along a plane orthogonal to a central axis line of the piston rod 21.

A stopper member 32 and a buffer 33, both of which are annular, are provided on the piston rod 21 at a portion of the main shaft portion 27 between the piston 18 and the rod guide 22. The piston rod 21 is inserted through an inner peripheral side of the stopper member 32, and the stopper member 32 is fixed to a radially inwardly recessed fixation groove 34 of the main shaft portion 27 by being swaged. The piston rod 21 is also inserted through Inside the buffer 33, and the buffet 33 is disposed between the stopper member 32 and the rod guide 22.

The shock absorber 1 is mounted, for example, in such a manner that the protruding portion of the piston rod 21 from the cylinder 2 is disposed on the upper portion and is supported by a vehicle body, and the mounting eye 13 on the cylinder 2 side is disposed on the lower portion and is coupled with a wheel side. In an opposite manner therefrom, the shock absorber 1 may be mounted in such a manner that the cylinder 2 side is supported by the vehicle body and the piston rod 21 is coupled with the wheel side. When the wheel vibrates according to running, positions of the cylinder 2 and the piston rod 21 are changed relative to each other according to this vibration, but this change is eliminated or reduced by fluid resistance in a fluid passage formed in at least any one of the piston 18 and the piston rod 21. As will be described in detail below, the fluid passage formed in at least any one of the piston 18 and the piston rod 21 is formed in such a manner that the fluid resistance therein varies according to a speed and an amplitude of the vibration, and ride comfort can be improved by damping the vibration. Besides the vibration generated by the wheel, an inertial force and a centrifugal force generated on the vehicle body according to the running of the vehicle are also applied to between the above-described cylinder 2 and piston rod 21. For example, the centrifugal force is generated on the vehicle body due to a change in a running direction based on an operation of a steering wheel, and a force based on this centrifugal force is applied to between the above-described cylinder 2 and piston rod 21. As will be described below, the shock absorber 1 has an excellent characteristic against the vibration based on the force generated on the vehicle body according to the running of the vehicle, and can acquire high stability when the vehicle is running.

Figure 2:
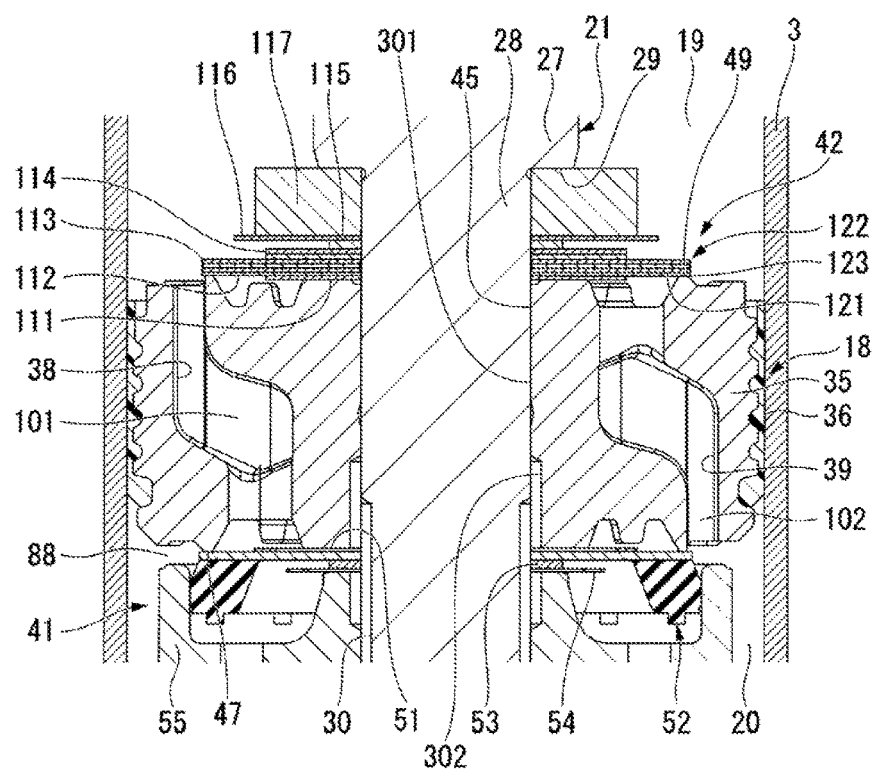
FIG. 2 is a partial cross-sectional view of a vicinity of a piston in the shock absorber according to the first embodiment of the present invention.

As illustrated in FIG. 2, the piston 18 includes a metallic piston main body 35 and an annular sliding member 36 made from synthetic resin. The piston main body 35 is supported by the piston rod 21. The sliding member 36 is integrally attached to an outer peripheral surface of the piston main body 35, and slides in the inner tube 3.

A plurality of passage holes 38 (only one hole 38 is illustrated in FIG. 2 because FIG. 2 is presented as a cross-sectional view) and a plurality of passage holes 39 (only one hole 39 is illustrated in FIG. 2 because FIG. 2 is presented as a cross-sectional view) are provided in the piston main body 35. The plurality of passage holes 38 forms passages inside them that establish communication between the upper chamber 19 and the lower chamber 20, and allow the oil fluid to flow out from the upper chamber 19 toward the lower chamber 20 during the movement of the piston 18 toward the upper chamber 19 side, i.e., the extension stroke. The plurality of passage holes 39 forms passages inside them that allow the oil fluid to flow out from the lower chamber 20 toward the upper chamber 19 during the movement of the piston 18 toward the lower chamber 20 side, i.e., the compression stroke. In other words, the passages in the plurality of passage holes 38 and the passages in the plurality of passage holes 39 establish the communication so as to allow the oil fluid, which is the hydraulic fluid, to flow between the upper chamber 19 and the lower chamber 20 due to the movement of the piston 18. The passage holes 38 are formed at equal pitches while sandwiching one passage hole 39 therebetween circumferentially, and one axial side (an upper side in FIG. 2) and the other axial side (a lower side in FIG. 2) of the piston 18 are opened on a radially outer side and a radially inner side, respectively.

Figure 3:
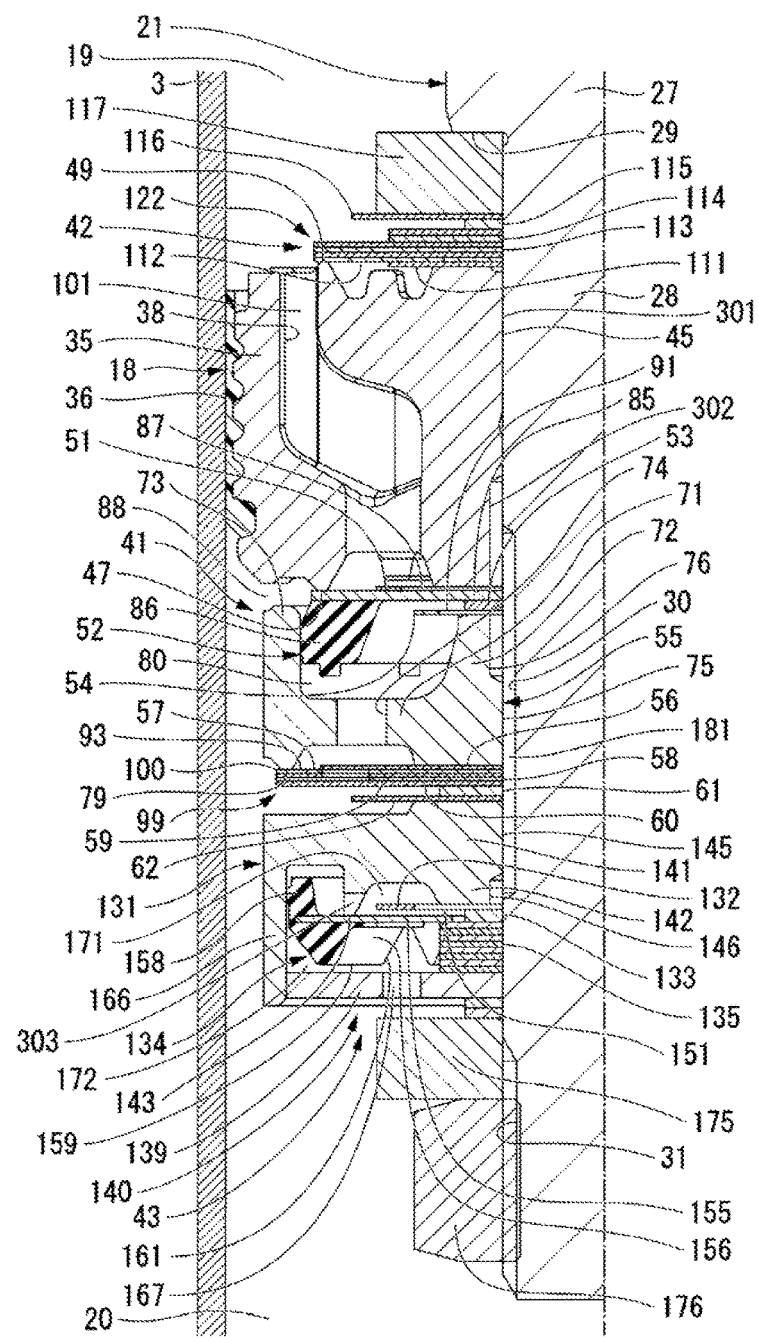
FIG. 3 is a partial cross-sectional view of a vicinity of the piston, a damping force generation mechanism, and a damping force variable mechanism that illustrates the shock absorber according to the first embodiment of the present invention.

As illustrated in FIG. 3, a damping force generation mechanism 41 is provided with respect to these passage holes 38, which are half of the passage holes. The damping force generation mechanism 41 generates a damping force by the movement of the piston 18. The damping force generation mechanism 41 is disposed on the lower chamber 20 side, which is one axial end side of the piston 18, and is attached to the piston rod 21. The passage holes 38 form extension-side passages inside them, through which the oil fluid passes when the piston rod 21 and the piston 18 move toward the extension side (an upper side in FIG. 3), and the damping force generation mechanism 41 provided with respect to them serves as an extension-side damping force generation mechanism that generates a damping force by prohibiting or reducing a flow of the oil fluid in the passages in the extension-side passage holes 38. A damping force variable mechanism 43 is attached to the attachment shaft portion 28 of the piston rod 21 adjacently to an opposite side of the damping force generation mechanism 41 from the piston 18. The damping force variable mechanism 43 makes the damping force variable dependent on a frequency of a reciprocating movement of the piston 18 (hereinafter referred to as a piston frequency) during the extension stroke.

Further, as illustrated in FIG. 2, the passage holes 39, which account for the remaining half of the passage holes, are formed at equal pitches while sandwiching one passage hole 38 therebetween circumferentially, and the other axial side (the lower side in FIG. 2) and the one axial side (the upper side in FIG. 2) of the piston 16 are opened on the radially outer side and the radially inner side, respectively.

Then, a damping force generation mechanism 42, which generates a damping force, is provided with respect to these passage holes 39, which are the remaining half of the passage holes. The damping force generation mechanism 42 is disposed on the upper chamber 19 side in the axial direction, which is the other axial end side of the piston 18, and is attached to the piston rod 21. The passage holes 39 form compression-side passages inside them, through which the oil fluid passes when the piston rod 21 and the piston 18 move toward the compression side (the lower side in FIG. 2), and the damping force generation mechanism 42 provided with respect to them serves as a compression-side damping force generation mechanism that generates a damping force by prohibiting or reducing a flow of the oil fluid in the passages in the compression-side passage holes 39.

The piston main body 35 has a generally disk shape, and a fitting hole 45 is formed at a radial center thereof. The fitting hole 45 penetrates axially, and is used to fit the attachment shaft portion 28 of the piston rod 21. An axial end portion of the piston main body 35 on the lower chamber 20 side supports an inner peripheral side of the damping force generation mechanism 41 at a portion thereof between the fitting hole 45 and the passage holes 38. An axial end portion of the piston main body 35 on the upper chamber 19 side supports an inner peripheral side of the damping force generation mechanism 42 at a portion thereof between the fitting hole 45 and the passage hole 39.

An annular valve seat portion 47, which is a part of the damping force generation mechanism 41, is formed at the axial end portion of the piston main body 35 on the lower chamber 20 side on a radially outer side with respect to openings of the passage holes 38 on the lower chamber 20 side. Further, an annular valve seat portion 49, which is a part of the damping force generation mechanism 42, is formed at the axial end portion of the piston main body 35 on the upper chamber 19 side on a radially outer side with respect to openings of the passage holes 39 on the upper chamber 19 side. The fitting hole 45 of the piston main body 35 includes a small-diameter hole portion 301 and a large-diameter hole portion 302. The small-diameter hole portion 301 is used to fit the attachment shaft portion 28 of the piston rod 21, and is located on a valve seat portion 49 side in the axial direction. The large-diameter hole portion 302 is located on a valve seat portion 47 side in the axial direction with respect to the small-diameter hole portion 301. The large-diameter hole portion 302 of the piston main body 35 is formed on a seat member 55 side while facing the piston rod 21.

An opposite side of the piston main body 35 from the fitting hole 45 of the valve seat portion 47 has a stepped shape located at a lower axial height than the valve seat portion 47, and openings of the compression-side passage holes 39 on the lower chamber 20 side are disposed at this stepped portion. Further, similarly, an opposite side of the piston main body 35 from the fitting hole 45 of the valve seat portion 49 has a stepped shape located at a lower axial height than the valve seat portion 49, and openings of the extension-side passage holes 38 on the upper chamber 19 side are disposed on this stepped portion.

As illustrated in FIG. 3, the extension-side damping force generation mechanism 41 is a pressure control-type valve mechanism, and includes a single disk 51, a single main valve 52, a single disk 53, a single disk 54, a single seat member 55, a single disk 56, a single disk 57, a single disk 58, a single disk 59, a single disk 60, a single disk 61, and a single disk 62 in this order from the piston 18 side in the axial direction. The disks 51, 53, 54, and 56 to 62, and the seat member 55 are metallic. All the disks 51, 53, 54, and 56 to 62 have holed circular plate-like shapes keeping constant thicknesses to which the attachment shaft portion 28 of the piston rod 21 can be fitted inside them. All the main valve 52 and the seat member 55 have annular shapes to which the attachment shat portion 28 of the piston rod 21 can be fitted inside them.

The seat member 55 includes a holed disk-like bottom portion 71, a cylindrical inner cylindrical portion 72, and a cylindrical outer cylindrical portion 73. The bottom portion 71 extends along the direction orthogonal to the axis. The inner cylindrical portion 72 is formed on an inner peripheral side of the bottom portion 71, and extends along the axial direction. The outer cylindrical portion 73 is formed on an outer peripheral side of the bottom portion 71, and extends along the axial direction. The bottom portion 71 is offset from the inner cylindrical portion 72 and the outer cylindrical portion 73 toward one axial side. An axially penetrating through-hole 74 is formed through the bottom portion 71. inside the inner cylindrical portion 72, a small-diameter hole portion 75 is formed on a bottom portion 71 side in the axial direction, and a large-diameter hole portion 76 is formed on an opposite side from the bottom portion 71 in the axial direction. The small-diameter hole portion 75 allows the attachment shaft portion 28 of the piston rod 21 to be fitted thereto. The large-diameter hole portion 76 is larger in diameter than the small-diameter hole portion 75.

An end portion of the inner cylindrical portion 72 of the seat member 55 on the bottom portion 71 side in the axial direction supports an inner peripheral side of the disk 56, and an end portion of the inner cylindrical portion 72 on the opposite side from the bottom portion 71 in the axial direction supports an inner peripheral side of the disk 54. An end portion of the outer cylindrical portion 73 of the seat member 55 on the bottom portion 71 side in the axial direction forms an annular valve seat portion 79. An inside of the seat member 55 including the through-hole 74 forms a pilot chamber 80. The pilot chamber 80 applies a pressure to the main valve 52 in a direction toward the piston 18.

The disk 51 has an outer diameter smaller than an inner diameter of the valve seat portion 47. The main valve 52 includes a metallic disk 85 and a rubber seal member 86 fixedly attached to the disk 85. The disk 85 has a holed circular plate-like shape keeping a constant thickness to which the attachment shaft portion 28 of the piston rod 21 can be fitted inside it, and has an outer diameter slightly larger than an outer diameter of the valve seat portion 47. The seal member 86 is fixedly attached to an outer peripheral side of the disk 85 opposite from the piston 18, and has an annular shape.

An axially penetrating through-hole 87 is formed through the disk 51 on a radially outer side of the piston main body 35 with respect to the passage holes 38. The disk 85 can be seated on the valve seat portion 47 of the piston 18. The main valve 52 is provided between the passages in the passage holes 38 provided in the piston 18 and the pilot chamber 80 provided in the seat member 55, and generates a damping force by prohibiting or reducing a flow of the oil fluid generated due to the sliding movement of the piston 18 toward the extension side. This main valve 52 is a disk valve.

The seal member 86 seals a space between the main valve 52 and the outer cylindrical portion 73 by contacting an inner peripheral surface of the outer cylindrical portion 73 of the seat member 55 over an entire circumference. Therefore, the above-described pilot chamber 80 between the main valve 52 and the seat member 55 applies an inner pressure to the main valve 52 in the direction toward the piston 18, i.e., a valve-closing direction for causing the disk 85 to be seated on the valve seat portion 47. The through-hole 87 of the disk 51, the large-dimeter hole portion 302 of the piston 18, the passage groove 30 of the piston rod 21, and a cutout 91 of the disk 54 serve as a passage for introducing the oil fluid from the upper chamber 19 in the cylinder 2 into the pilot chamber 80 via the passages in the passage holes 38. The main valve 52 is a pilot-type damping valve including the pilot chamber 80, and allows the oil fluid from the passages in the passage holes 38 to flow toward the lower chamber 20 via a passage 88 radially extending between the piston 18 and the outer cylindrical portion 73 of the seat member 55 when the disk 85 is separated from the valve seat portion 47 of the piston 18 and is opened. In other words, the extension-side damping force generation mechanism 41 introduces a part of the flow of the oil fluid into the pilot chamber 80 via a passage in the through-hole 87 of the disk 51, the large-diameter hole portion 302 of the piston 18, the passage groove 30 of the piston rod 21, and the cutout 91 of the disk 54, and controls opening of the main valve 52 with use of the pressure in the pilot chamber 80.

The disk 53 has an outer diameter smaller than an outer diameter of the inner cylindrical portion 72 and larger than an inner diameter of the large-diameter hole portion 76. The disk 54 is a common part made from the same material and having the same shape as the disk 51, and includes the cutout 91 formed on an inner peripheral side thereof. The cutout 91 extends radially across a portion of the inner cylindrical portion 72 that contacts the disk 54, and the passage in the large-diameter hole portion 76 of the seat member 55 and the pilot chamber 80 are in constant communication with each other via a passage in the cutout 91.

The disk 56 has an outer diameter smaller than an inner diameter of the valve seat portion 79 of the seat member 55. The disk 57 has an outer diameter slightly larger than an outer diameter of the valve seat portion 79, and is configured to be able to be seated on the valve seat portion 79. The disk 57 includes a cutout 93 on an outer peripheral side thereof, and the cutout 93 extends radially across the valve seat portion 79.

The disk 58, the disk 59, and the disk 60 have outer diameters equal to the outer diameter of the disk 57. The disk 61 has an outer diameter smaller than an outer diameter of the disk 60. The disk 62 has an outer diameter larger than the outer diameter of the disk 61 and smaller than the outer diameter of the disk 60.

The disks 57 to 60 form a disk valve 99 that can be seated on and separated from the valve seat portion 79, and prohibits or reduces a flow of the oil fluid between the pilot chamber 80 and the lower chamber 20 while establishing communication therebetween by being separated from the valve seat portion 79. The pilot chamber 80 is formed by being surrounded by the main valve 52, the seat member 55, and the disk valve 99, and the cutout 93 of the disk 57 forms a fixed orifice 100 keeping the pilot chamber 80 and the lower chamber 20 in communication with each other even with the disk 57 in abutment with the valve seat portion 79. The disk 62 prevents or reduces a deformation of the disk valve 99 by abutting the disk 60 at the time of a deformation of the disk valve 99 in an opening direction.

An extension-side first passage 101, through which the oil fluid flows out from the upper chamber 19 toward the lower chamber 20 due to the movement of the piston 18 during the extension stroke, is formed by the passages in the extension-side passage holes 38 provided in the piston 18, the space between the main valve 52 and the valve seat portion 47 when the valve is opened, the passage 88 radially extending between the piston 18 and the outer cylindrical portion 73, the through-hole 87 provided through the disk 51, the large-diameter hole portion 302 of the piston 38, the large-diameter hole portion 76 of the seat member 55 and the cutout 91 of the disk 54, the pilot chamber 80, the fixed orifice 100, and the space between the disk valve 99 and the valve seat portion 75 when the valve is opened. The extension-side damping force generation mechanism 41 is disposed in this extension-side first passage 101 and generates the damping force.

As illustrated in FIG. 2, the compression-side damping force generation mechanism 42 Includes a single disk 111, a single disk 112, a plurality of disks 113, a plurality of disks 114, a single disk 115, a single disk 116, and a single annular member 117 in this order from the piston 18 side in the axial direction. The disks 111 to 116 and the annular member 117 are metallic, and all of them have holed circular plate-like shapes keeping constant thicknesses to which the attachment shaft portion 28 of the piston rod 21 can be fitted inside them.

The disk 111 has an outer diameter smaller than the inner diameter of the valve seat portion 49 of the piston 18. The disk 112 has an outer diameter slightly larger than the outer diameter of the valve seat portion 49 of the piston 18, and is configured to be able to be seated on the valve seat portion 49. The disk 112 includes a cutout 121 formed on an outer peripheral side thereof, and the cutout 121 extends radially across the valve seat portion 49.

The plurality of disks 113 is common parts made from the same material and having the same shape as each other or one another, and has outer diameters equal to the outer diameter of the disk 112. The plurality of disks 114 is common parts made from the same material and having the same shape as each other or one another, and has outer diameters smaller than the outer diameters of the disks 113. The disk 115 has an outer diameter smaller than the outer diameters of the disks 114. The disk 116 has an outer diameter larger than the diameters of the disks 114 and smaller than the outer diameters of the disks 113. The annular member 117 has an outer diameter smaller than the outer diameter of the disk 116 and is thicker and stiffer than the disks 111 to 116. This annular member 117 is in abutment with the shaft stepped portion 29 of the piston rod 21.

The disks 112 to 114 form a disk valve 122 that can be seated on and separated from the valve seat portion 49, and prohibits or reduces the flow of the oil fluid between the upper chamber 19 and the lower chamber 20 while being able to open the passages in the passage holes 39 to the upper chamber 19 by being separated from the valve seat portion 49. The cutout 121 of the disk 112 forms a fixed orifice 123 keeping the upper chamber 19 and the lower chamber 20 in communication with each other even with the disk 112 in abutment with the valve seat portion 49. The annular member 117 restricts a deformation of the disk valve 122 in an opening direction that is equal to or greater than a predetermined amount.

A compression-side first passage 102, through which the oil fluid flows out of the lower chamber 20 toward the upper chamber 19 due to the movement of the piston 18 during the compression stroke, is formed by the passages in the compression-side passage holes 39 provided In the piston 18, the fixed orifice 23, and the space between the disk valve 122 and the valve seat portion 49 when the valve is opened. The compression-side damping force generation mechanism 42 is provided in this compression-side first passage 102, and generates the damping force.

In the present embodiment, the extension-side disk valve 99 and the compression-side disk valve 122 illustrated in FIG. 3 have been described referring to the example in which both of them are disk valves clamped at inner peripheries thereof, but are not limited thereto and may be any mechanism capable of generating the damping force. For example, these valves may be lift-type valves in which a disk valve is biased with use of a coil spring or may be poppet valves.

The damping force variable mechanism 43 includes a single bottomed cylindrical housing 131, a single disk 132, a single disk 133 and a single partition disk 134 (disk), a plurality of disks 135, and an annular facing member 139, which faces the partition disk 134, in this order from the damping force generation mechanism 41 side in the axial direction. The housing 131, the disks 132, 133, and 135, and the facing member 139 are metallic. All the disks 132, 133, and 135 have holed circular plate-like shapes keeping constant thicknesses to which the attachment shaft portion 28 of the piston rod 21 can be fitted inside them, and all the housing 131 and the facing member 139 have annular shapes to which the attachment shaft portion 28 of the piston rod 21 can be fitted inside them.

The facing member 139 is annular, and forms a tubular case member 140 together with the housing 131 by being fitted to the housing 131. The housing 131 includes a holed disk-like bottom portion 141, a cylindrical inner cylindrical portion 142, and a cylindrical protruding portion 143. The bottom portion 141 extends along the direction orthogonal to the axis. The inner cylindrical portion 142 is formed on an inner peripheral side of the bottom portion 141 and extends along the axial direction. The protruding portion 143 is formed on an outer peripheral side of the bottom portion 141 with respect to the inner cylindrical portion 142, and extends along the axial direction. The inner cylindrical portion 142 protrudes from the bottom portion 141 toward both axial sides, and the protruding portion 143 protrudes from the bottom portion 141 only toward one axial side. Inside the inner cylindrical portion 142, a small-diameter hole portion 145 is formed on an opposite side from a direction in which the protruding portion 143 protrudes axially, and a large-diameter hole portion 146 is formed on a protruding portion 143 side in the axial direction. The small-diameter hole portion 145 allows the attachment shaft portion 28 of the piston rod 21 to be fitted thereto. The large-diameter hole portion 146 is larger in diameter than the snail-diameter hole portion 145. Further, a cylindrical tubular portion 166 is formed on an outer peripheral side of the bottom portion 141 with respect to the protruding portion 143.

The inner cylindrical portion 142 of the housing 131 supports an inner peripheral side of the disk 62 by one end portion thereof on a small-diameter hole portion 145 side in the axial direction, and supports an inner peripheral side of the disk 132 by the other end portion thereof on a large-diameter hole portion 146 side in the axial direction. The protruding portion 143 of the housing 131 protrudes toward the partition disk 134, and restricts a movement of the partition disk 134 more than that toward a bottom portion 141 side by abutting against the partition disk 134. The protruding portion 143 supports an outer peripheral side of the partition disk 134 by an end portion thereof on a protruding distal side. Further, the protruding portion 143 includes a circumferentially partially formed cutout 303, and a radially inner side and a radially outer side of the protruding portion 143 in the housing 131 are in constant communication with each other.

The disk 132 has an outer diameter larger than a portion of the inner cylindrical portion 142 that is in contact with the disk 132, and smaller than an inner diameter of the protruding portion 143. The disk 132 includes a cutout 151 formed on an inner peripheral side thereof. The cutout 151 extends radially across the portion of the inner cylindrical portion 142 that is in contact with the disk 132. The disk 133 has an outer diameter smaller than the outer diameter of the disk 132.

The partition disk 134 includes a metallic disk 155 and a rubber seal member 156 fixedly attached to an outer peripheral side of the disk 155, and is configured to be elastically deformable. The disk 155 has a holed circular plate-like shape keeping a constant thickness that can be disposed so as to be spaced apart from the inner disk 133, and is thinner than the disk 133. The disk 155 has an outer diameter larger than an outer diameter of the protruding portion 143 of the housing 131.

The seal member 156 has an annular shape, and is fixedly attached on the outer peripheral side of the disk 155. The seal member 156 includes an annular seal portion 158 and an annular elastic portion 159. The seal portion 158 protrudes from the disk 155 toward an opposite side from the facing member 139 in the axial direction. The elastic portion 159 protrudes from the disk 155 toward a facing member 139 side in the axial direction. Further, an annular space is generated between the disk 155 and the housing 131, and the seal member 156 fixedly attaches the seal portion 158 and the elastic portion 159 on both surfaces of the disk 155 via this space. The employment of such a configuration allows the seal member 156 to be easily fixedly attached to the disk 155. An inner diameter of the seal portion 158 is minimized at an end portion thereof on a disk 155 side, and this inner diameter is slightly larger than the outer diameter of the protruding portion 143. This configuration allows the disk 155 of the partition disk 134 to abut against the protruding portion 143 of the housing 131. A radial groove 161 is formed on the elastic portion 159. The radial groove 161 is opened on an opposite side from the disk 155, and penetrates radially. Due to this radial groove 161, the disk 155 of the partition disk 134 abuts against the protruding portion 143 when the pressure in the lower chamber 20 exceeds a pressure in a variable chamber 171, which will be described below. Since the cutout 303 is provided at the protruding portion 143, pressure-receiving areas approximately match each other on one side of the disk 155 where the seal portion 158 is provided and the other side of the disk 155 where the elastic portion 159 is provided.

The disk 135 has an outer diameter larger than an inner diameter of the disk 155 of the partition disk 134. Due to this configuration, an inner peripheral side of the partition disk 134 is supported between the disk 132 and the disk 135 movably within a range corresponding to an axial length of the disk 133. In other words, the partition disk 134 is provided movably relative to the case member 140 including the housing 131 and the facing member 139 that moves integrally with the disks 132, 133, and 135, and the like. Further, the annular seal portion 158 is provided on the partition disk 134 on the outer peripheral side, which is an unsupported side. The seal portion 158 seals between an outer periphery of the partition disk 134 and on inner periphery of the housing 131 of the case member 140. The seal member 156 including the seal portion 158 is centered relative to the case member 140 by contacting the case member 140. In other words, the inner peripheral side of the partition disk 134 is supported by a simple support structure that is supported by the disk 135 on only one surface side without being clamped from both surface sides. The seal portion 158 is provided on the protruding portion 143 side of the partition disk 134 in the axial direction, and overlaps this protruding portion 143 axially.

The facing member 139 is provided on an opposite side of the partition disk 134 from the bottom portion 141 so as to face the partition disk 134. The facing member 139 has a holed disk-like shape to which the attachment shaft portion 28 of the piston rod 21 can be fitted inside it, and is fitted in the cylindrical portion 166 of the housing 131. The elastic portion 159 is provided on an opposite side of the partition disk 134 from the surface where the seal portion 158 is provided. Therefore, the elastic portion 159 is provided between the opposite side of the partition disk 134 from the surface where the seal portion 158 is provided, and the facing member 139. A through-hole 167 is formed through the facing member 139. The through-hole 167 axially penetrates through a radially intermediate portion of the facing member 139. The through-hole 167 is formed on a radially outer side of the facing member 139 with respect to the disk 135, and is formed on a radially inner side with respect to the seal member 156 brought into contact with the facing member 139 due to a deflection of the disk 155.

The seal portion 158 of the partition disk 134 seals a space between the partition disk 134 and the cylindrical portion 166 by contacting an inner peripheral surface of the cylindrical portion 166 of the housing 131 over an entire circumference. In other words, the partition disk 134 is a packing valve. The seal portion 158 constantly seals the space between the partition disk 134 and the cylindrical portion 166 even when the partition disk 134 is deformed in an allowable range in the case member 140. The partition disk 134 is centered relative to the case member 140 as described above due to the contact of the seal portion 158 thereof with the cylindrical portion 166 over the entire circumference. The partition disk 134 divides the inside of the case member 140 into the variable chamber 171 (a housing inner chamber), which is located on a bottom portion 141 side in the housing 131 and has a variable volume, and a variable chamber 172, which is located on a facing member 139 side in the housing 131 and has a variable volume. In other words, the partition disk 134 forms the variable chamber 171 between the partition disk 134 and the bottom portion 141 of the housing 131. The variable chamber 171 is in communication with a passage in the large-diameter hole portion 146 of the housing 131 via a passage in the cutout 151 of the disk 132, and the variable chamber 172 is in communication with the lower chamber 20 via a passage in the through-hole 167 of the facing member 139.

The piston rod 21 penetrates through the annular member 117, the disk 116, the disk 115, the plurality of disks 114, the plurality of disks 113, the disk 112, the disk 111, the piston 18, the disk 51, the main valve 52, the disk 53, the disk 54, the seat member 55, the disk 56, the disk 57, the disk 58, the disk 59, the disk 60, the disk 61, the disk 62, the housing 131, the disk 132, and the disk 133 stacked on the shaft stepped portion 29 in this order, with the attachment shaft portion 28 inserted inside each of them. The seat member 55 causes the seal member 86 of the main valve 52 to be fitted to the outer cylindrical portion 73.

Further, the partition disk 134 is stacked on the protruding portion 143 of the housing 131 with the disk 133 inserted inside it. further, the plurality of disks 135 and the facing member 139 are stacked on the disk 133 in this order with the attachment shaft portion 28 inserted inside each of them. At this time, the facing member 139 is fitted to the cylindrical portion 166 of the housing 131. In addition, an annular member 175, which is a common part made from the same material and having the same shape as the annular member 117, is stacked on the facing member 139 with the attachment shaft portion 28 inserted inside it.

A nut 176 is threadably engaged with the male screw 31 of the attachment shaft portion 28 protruding beyond the annular member 175 with the parts disposed in this manner. In this state, the shaft stepped portion 29 of the piston rod 21 and the nut 176 sandwich therebetween the inner peripheral side or a whole of each of the annular member 117, the disk 116, the disk 115, the plurality of disks 114, the plurality of disks 113, the disks 112 and 111, the piston 18, the disk 51, the main valve 52, the disks 53 and 54, the seat member 55, the disks 56 to 62, the housing 131, the disks 132 and 133, the plurality of disks 135, the facing member 139, and the annular member 175, by which they are axially clamped. At this time, the inner peripheral side of the partition disk 134 is not axially clamped. The nut 176 is a general-purpose hexagonal nut. In the present embodiment, the nut 176 is the general-purpose hexagonal nut, but may have a surface other than six sides and/or may be realized with use of a dedicated nut. Further, the housing 131 and the annular member 175 may be fixed by being swaged to the piston rod 21 instead of being fastened with use of the nut 176.

In other words, the compression-side damping force generation mechanism 42, the piston 18, the extension-side damping force generation mechanism 41, and the extension-side damping force variable mechanism 43 are fastened to the piston rod 21 with use of the nut 176 with the piston rod 21 inserted on the respective inner peripheral sides. This means that the piston 18, and the housing 131 forming the damping force variable mechanism 43, the disks 132 and 133, the plurality of disks 135, and the facing member 139 are fastened to the piston rod 21 with use of the nut 176 with the piston rod 21 inserted on the inner peripheral sides thereof. The piston rod 21 serves as a pin member inserted on the inner peripheral sides of the housing 131 and the facing member 139 to fasten the inner peripheral sides of the housing 131 and the facing member 139. The case member 140 including the housing 131 and the facing member 139, the disks 132 and 133, the plurality of disks 135 are provided on the piston 18.

The present configuration leads to establishment of the communication between the passage in the through-hole 87 of the disk 51, the passage in the large-diameter hole portion 302 of the piston 18, the passage in the passage groove 30 of the piston rod 21, the passage in the large-diameter hole portion 76 of the seat member 55 of the extension-side damping force generation mechanism 41, and the passage in the large-diameter hole portion 146 of the housing 131 of the damping force variable mechanism 43, with them attached to the piston rod 21 in this manner. This leads to establishment of constant communication of the pilot chamber 80 with the variable chamber 171 of the damping force variable mechanism 43 via the passage in the cutout 91 of the disk 54, the passage in the large-diameter hole portion 76 of the seat member 55, the passage in the passage groove 30 of the piston rod 21, the passage in the large-diameter hole portion 146 of the housing 131, and the passage in the cutout 151 of the disk 132. Further, the present configuration leads to establishment of constant communication of the variable chamber 172 of the damping force variable mechanism 43 with the lower chamber 20 via the through-hole 167 of the facing member 139. The passage in the cutout 91, the passage in the large-diameter hole portion 76, the passage in the passage groove 30, the passage in the large-diameter hole portion 146, the passage in the cutout 151 of the disk 132, the variable chambers 171 and 172, and the passage in the through-hole 167 branch off from the above-described extension-side first passage 101, and form an extension-side second passage 181 provided in parallel with the first passage 101 after the branching. Therefore, the two variable chambers 171 and 172, which are at least a part of the second passage 181, are provided by being defined by the partition disk 134 Inside the case member 140.

The partition disk 134 is configured to be deformable within a range in which the inner peripheral side thereof moves between the disk 132 and the disk 135 and the outer peripheral side thereof moves between the protruding portion 143 and the facing member 139. Now, a shortest axial distance between the protruding portion 143 supporting the outer peripheral side of the disk 155 of the partition disk 134 from one axial side and the disk 135 supporting the inner peripheral side of the disk 155 from the other axial side is shorter than an axial thickness of the disk 155. Therefore, when the pressures in the variable chambers 171 and 172 match each other, the disk 155 is in pressure contact with the protruding portion 143 and the disk 135 over an entire circumference in a slightly deformed state due to an elastic force of the disk 155 itself. The partition disk 134 blocks the flow of the oil fluid between the variable chambers 171 and 172 of the second passage 181 with the inner peripheral side thereof in contact with the disk 135 over the entire circumference. The partition disk 134 is set so as to be in constant contact with the disk 135 over the entire circumference thereof regardless of the pressure states of the variable chambers 171 and 172, and therefore constantly blocks the flow between the variable chambers 171 and 172 of the second passage 181. The partition disk 134 may be configured as a check valve that blocks the flow during the extension stroke but permits the flow during the compression stroke.

As illustrated in FIG. 1, the above-described bottom valve 25 is provided between the bottom member 12 of the outer tube 4 and the inner tube 3. This bottom valve 25 includes a bottom valve member 191, a plurality of disks 192, a single disk 193, and a pin member 194. The bottom valve member 191 separates the lower chamber 20 and the reservoir chamber 6 from each other. The plurality of disks 192 is provided on a lower side, i.e., a reservoir chamber 6 side of this bottom valve member 191. The disk 193 is provided on an upper side, i.e., a lower chamber 20 side of the bottom valve member 191. The pin member 194 attaches the plurality of disks 192 and the disk 193 to the bottom valve member 191.

The bottom valve member 191 has an annular shape with the pin member 194 inserted through a radial center thereof. A plurality of passage holes 195 and a plurality of passage holes 196 are formed through the bottom valve member 191. The passage holes 195 allow the oil fluid to flow between the lower chamber 20 and the reservoir chamber 6. The passage holes 196 allow the oil fluid to flow between the lower chamber 20 and the reservoir chamber 6 on a radially outer side of these passage holes 195. The plurality of disks 192 on the reservoir chamber 6 side prohibits or reduces a flow of the oil fluid from the reservoir chamber 6 toward the lower chamber 20 via the passage holes 195 while permitting a flow of the oil fluid from the lower chamber 20 toward the reservoir chamber 6 via the passage holes 195. The disk 193 prohibits or reduces a flow of the oil fluid from the lower chamber 20 toward the reservoir chamber 6 via the passage holes 196 while permitting a flow of the oil fluid from the reservoir chamber 6 toward the lower chamber 20 via the passage holes 196.

The plurality of disks 192 forms a compression-side damping force generation mechanism 197 together with the bottom valve member 191. The compression-side damping force generation mechanism 197 causes the oil fluid to flow from the lower chamber 20 toward the reservoir chamber 6 and generates a damping force by being opened during the compression stroke of the shock absorber 1. The disk 193 forms a suction valve 198 together with the bottom valve member 191. The suction valve 198 causes the oil fluid to flow from the reservoir chamber 6 toward the lower chamber 20 by being opened during the extension stroke of the shock absorber 1. The suction valve 198 fulfils a function of allowing the fluid to flow from the reservoir chamber 6 toward the lower chamber 20 without substantially generating the damping force so as to compensate for insufficiency of the fluid mainly caused by extension and protrusion of the piston rod 21 from the cylinder 2.

When only the extension-side damping force generation mechanism 41 functions during the extension stroke in which the piston rod 21 moves toward the extension side, while a movement speed of the piston 18 (hereinafter referred to as a piston speed) is slow, the oil fluid from the upper chamber 19 flows into the lower chamber 20 via the passages in the passage holes 38, the passage in the through-hole 87 of the disk 51, the passage in the large-diameter hole portion 302 of the piston 18, the passage in the passage groove 30 of the piston rod 21, the passage in the large-diameter hole portion 76 of the seat member 55 of the extension-side damping force generation mechanism 41, the passage in the cutout 91 of the disk 54, the pilot chamber 80, and the fixed orifice 100 of the disk valve 99, which form the first passage 101 illustrated in FIG. 3, thereby generating a damping force according to an orifice characteristic (the damping force is approximately proportional to a square of the piston speed). Therefore, the damping force has such a characteristic with respect to the piston speed that the damping force increases at a relatively high rate with respect to an increase in the piston speed as indicated in a low speed region on a left side of a solid line X11 in FIG. 4. Further, when the piston speed increases, the oil from the upper chamber 19 flows from the passages in the passage holes 38, the passage in the through-hole 87, the passage in the large-diameter hole portion 302 of the piston 18, the passage in the passage groove 30 of the piston rod 21, the passage in the large-diameter hole portion 76 of the seat member 55 of the extension-side damping force generation mechanism 41, the passage in the cutout 91 of the disk 54, and the pilot chamber 80, which form the first passage 101, into the lower chamber 20 by passing through between the disk valve 99 and the valve seat portion 79 while opening the disk valve 99, thereby generating a damping force according to a valve characteristic (the damping force is approximately proportional to the piston speed). At this time, the main valve 52 is closed. Therefore, the damping force has such a characteristic with respect to the piston speed that the damping force increases at a slightly lower rate with respect to the increase in the piston speed as indicated from an intermediate speed region at a center of the solid line X11 in a horizontal direction in FIG. 4 to a high speed region.

In the present embodiment, the shock absorber 1 has been described based on the example in which the main valve 52 is not opened even when the piston seed is located in the high speed region to increase the damping force when the piston speed is located from the intermediate speed region to the high speed region, but may be configured to open the main valve 52 by adjusting a plate thickness of the main valve 52, the pressure in the pilot chamber 80, and/or the like. In this case, forces (hydraulic pressures) applied to the main valve 52 have such a relationship that a force applied from the passages in the passage holes 38 in an opening direction exceeds a force applied from the pilot chamber 80 in a closing direction. This relationship means that the main valve 52 is separated and opened from the valve seat portion 47 of the piston 18 according to the increase in the piston speed, thereby allowing the oil fluid to flow into the lower chamber 20 via the passage 88 between the piston 18 and the outer cylindrical portion 73 of the seat member 55, which forms the first passage 101, in addition to the flow into the lower chamber 20 that passes through between the disk valve 99 and the valve seat portion 79 from the passages in the passage holes 38, the passage in the through-hole 87, and the pilot chamber 80, which also form the first passage 101, so that the increase in the damping force is prevented or cut down. By this arrangement, the damping force can have such a characteristic with respect to the piston speed that the damping force increases at a lower rate in the high speed region on a right side of the solid line X11 in FIG. 4. Now, the piston speed is defined to be slow when, for example, the piston speed is approximately 0 to 0.1 m/s, and the intermediate speed region of the piston speed and the high speed region of the piston speed are defined to be a speed region of approximately 0.1 to 0.6 m/s and a speed region higher than 0.6 m/s, respectively.

During the compression stroke in which the piston rod 21 moves toward the compression side, while the piston speed is slow, the oil fluid from the lower chamber 20 flows into the upper chamber 19 via the passages in the passage holes 39 and the fixed orifice 123 of the disk valve 122, which form the compression-side first passage 102 illustrated in FIG. 2, leading to generation of the damping force according to the orifice characteristic (the damping force is approximately proportional to the square of the piston speed). Therefore, the damping force has such a characteristic with respect to the piston speed that the damping force increases at a relatively high rate with respect to the increase in the piston speed as indicated in a low speed region on a left side of a solid line X12 in FIG. 4. Further, when the piston speed increases, the oil fluid introduced from the lower chamber 20 into the passages in the passage holes 39 forming the compression-side first passage 102 basically flows into the upper chamber 19 by passing through between the disk valve 122 and the valve seat portion 49 while opening the disk valve 122, thereby generating the damping force according to the valve characteristic (the damping force is approximately proportional to the piston speed). Therefore, the damping force has such a characteristic with respect to the piston speed that the damping force increases at a slightly lower rate with respect to the increase in the piston speed as indicated in intermediate and high speed regions from a center to a right side of the solid line X12 in the horizontal direction in FIG. 4.

The shock absorber 1 operates in the above-described manner when only the damping force generation mechanisms 41 and 42 function, but, in the first embodiment, the damping force variable mechanism 43 makes the damping force variable according to the piston frequency even when the piston speed is unchanged.

More specifically, during the extension stroke when the piston frequency is high, the pressure in the upper chamber 19 increases, which causes the oil fluid to be introduced from the upper chamber 19 into the variable chamber 171 of the damping force variable mechanism 43 via the passages in the passage holes 38 illustrated in FIG. 3, the passage in the through-hole 87 of the disk 51, the passage in the large-diameter hole portion 302 of the piston 18, the passage in the passage groove 30 of the piston rod 21, and a portion of the second passage 181 on a pilot chamber 80 side with respect to the variable chamber 171. According thereto, the oil fluid is discharged from the variable chamber 172 of the damping force variable mechanism 43, which is a portion of the second passage 181 on the lower chamber 20 side, into the lower chamber 20 via the passage in the through-hole 167 of the facing member 139. According thereto, the partition disk 134, which has been in abutment with the protruding portion 143 and the disk 135 until this time, is deformed so as to displace the elastic portion 159 toward the facing member 139.

The deformation of the partition disk 134 in this manner leads to introduction of the oil fluid from the upper chamber 19 into the variable chamber 171, thereby resulting in a reduction in a flow amount of the oil fluid flowing from the upper chamber 19 to the lower chamber 20 by passing through the first passage 101. Due to this reduction, the pressure in the pilot chamber 80 does not increase and the main valve 52 is opened, so that a soft extension-side damping force is generated as indicated by a broken line X13 in FIG. 4. Now, the inner peripheral side of the partition disk 134 is separated from the disk 132 and supported by the disk 135 only from the one surface side, and therefore is easily deformed so as to approach the disk 132 and thus is easily deformed in such a manner that the elastic portion 159 on the outer peripheral side approaches the facing member 139.

On the other hand, during the extension stroke in which the piston frequency is low, a frequency of the deformation of the partition disk 134 also reduces according thereto, so that the oil fluid flows from the upper chamber 19 into the variable chamber 171 at the beginning of the extension stroke, but, after that, the partition disk 134 abuts against the facing member 139 to stop, thereby prohibiting the oil fluid from flowing from the upper chamber 19 to the variable chamber 171. This results in such a state that the amount of oil fluid flowing from the upper chamber 19 to the lower chamber 20 by being introduced into the first passage 101 including the passages in the passage holes 38 and passing through the damping force generation mechanism 41 is not reduced, so that a hard extension-side damping force is generated as indicated by the solid line X11 in FIG. 4.

During the compression stroke, the pressure in the lower chamber 20 Increases but the partition disk 134 of the damping force variable mechanism 43 prevents or reduces the enlargement of the variable camber 172 by abutting against the protruding portion 143 of the housing 131, which leads to elimination or a reduction in the amount of the oil fluid introduced from the lower chamber 20 into the variable chamber 172 via the passage in the through-hole 167 of the facing member 139. This results in such a state that the amount of oil fluid flowing from the lower chamber 20 to the upper chamber 19 by being introduced into the passages in the passage holes 39 and passing through the damping force generation mechanism 42 is not reduced, so that a hard damping force is generated as indicated by the solid line X12 in FIG. 4. Further, the inner peripheral side of the partition disk 134 is separated from the disk 135 and therefore no differential pressure is generated, so that the partition disk 134 is not deflected.

The apparatus discussed in the above-described patent literature, PTL 1 is provided with the rod acceleration reduction mechanism on the bottom valve to prevent or reduce the generation of the abnormal noise. In the case where the mechanism for acquiring a predetermined characteristic is provided in the shock absorber in this manner, especially an axial length of the shock absorber undesirably increases. The same applies to a configuration in which a chamber for compensating a volume is formed, such as a frequency dependent shock absorber and a mechanism against impact shock. Then, the axial length is desired to be reduced.

The damping force variable mechanism 43 according to the first embodiment is configured to define the variable chamber 171 in the housing 131 by the annular elastically deformable partition disk 134 provided with the annular seal portion 158 sealing between the partition disk 134 and the housing 131. Therefore, the present embodiment can reduce the axial length and thus reduce a basic length and a size of the entire shock absorber 1.

In addition, the seal portion 158 of the partition disk 134 that seals between the outer periphery of the partition disk 134 and the inner periphery of the housing 131 is provided on the protruding portion 143 side that protrudes from the bottom portion 141 of the housing 131 toward the partition disk 134 and restricts the movement of the partition disk 134. Therefore, the present embodiment can further reduce the axial length and thus further reduce the basic length and the size of the entire shock absorber 1.

The damping force variable mechanism 43 including the housing 131 is provided on the piston 18 movably integrally with this piston 18. Therefore, the present embodiment can reduce an axial length of an integrally assembled assembly including the piston 18 and the piston rod 21.

The elastic portion 159 is provided between the opposite side of the partition disk 134 from the surface where the seal portion 158 is provided, and the facing member 139. Therefore, the present embodiment can prevent or reduce noise generated due to the abutment of the partition disk 134 with the facing member 139. Further, the present embodiment can smooth the deformation of the partition disk 134 due to the elastic deformation of the elastic portion 159, thereby smoothing a frequency variable characteristic.

Further, the present embodiment can reduce the axial length of the damping force variable mechanism 43, thereby allowing the respective inner peripheral sides of the piston rod 18 and the housing 131 of the damping force variable mechanism 43 to be fastened to the piston rod 21 with use of the general-purpose nut 176 with the piston rod 21 inserted. Therefore, the present embodiment allows the piston 18 and the damping force variable mechanism 43 to be easily fastened to the piston rod 21, thereby significantly improving assemblability.

Further, the inner peripheral side of the partition disk 134 is supported on only the one surface side without being clamped from the both surface sides, and therefore can be easily deformed and can easily change the volumes of the variable chambers 171 and 172. Therefore, the present embodiment can improve responsiveness of the damping force variable mechanism 43.

Figure 4:
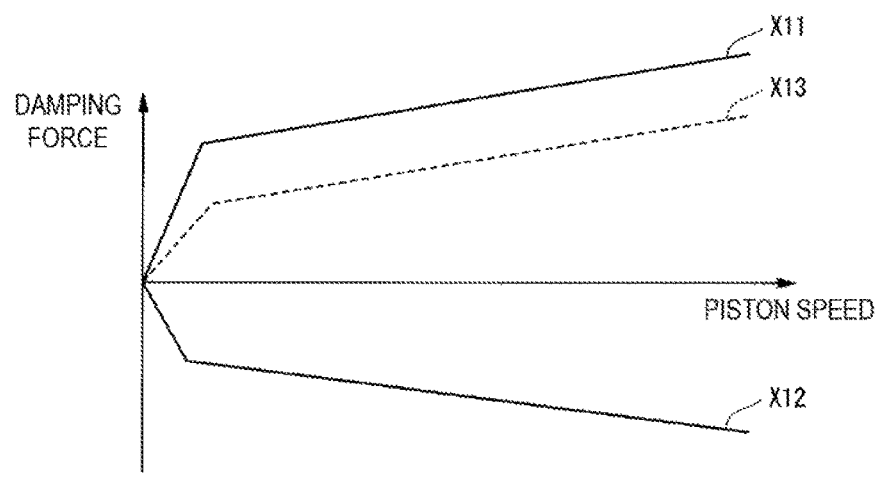
FIG. 4 illustrates a characteristic line conceptually indicating a relationship of a damping force with a piston speed of the shock absorber according to the first embodiment of the present invention.

Further, the extension-side damping force generation mechanism 41 is the pressure control-type mechanism including the main valve 52, which generates the damping force by prohibiting or reducing the flow of the oil fluid generated due to the sliding movement of the piston 18, and the pilot chamber 80, which causes the pressure to be applied to the main valve 52 in the valve opening direction, and configured to introduce a part of the flow of the oil fluid into the pilot chamber 80 and control the opening of the main valve 52 with use of the pressure in the pilot chamber 80, thereby being able to make the damping force variable as indicated, by the solid line X11 and the broken line X13 in FIG. 4 from the low speed region of the piston 18, in which the oil fluid flows by a small amount from the upper chamber 19 to the lower chamber 20, to the high speed region of the piston 18, in which the oil fluid flows by a large amount from the upper chamber 19 to the lower chamber 20, even if the volume of the damping force variable mechanism 43 is variable only within a narrow range. Therefore, the present embodiment can, for example, improve an impact shock when the piston speed is a high speed and a high frequency into soft ride feeling.

Further, the portion of the second passage 181 that is formed on the piston rod 21 is formed by the passage groove 30 formed on the outer peripheral portion of the attachment shaft portion 28 of the piston rod 21. Therefore, the present embodiment facilitates processing thereof.

Further, the shock absorber 1 is provided with the damping force variable mechanism 43 functioning during the extension stroke and is not provided with a damping force variable mechanism functioning during the compression stroke. Therefore, the present embodiment can achieve improvement of the ride feeling under, for example, a road surface condition for which it is effective to make the damping force variable dependent on the piston frequency during the extension stroke, while preventing or cutting down a cost increase. Further, the present embodiment can be preferably used for a vehicle difficult to control a posture thereof by a shock absorber including a damping force variable mechanism making the damping force variable dependent on the piston frequency during the compression stroke, and capable of effectively controlling the posture thereof by the shock absorber including the damping force variable mechanism 43 making the damping force variable dependent on the piston frequency during the extension stroke.

[Second Embodiment]

Figure 6:
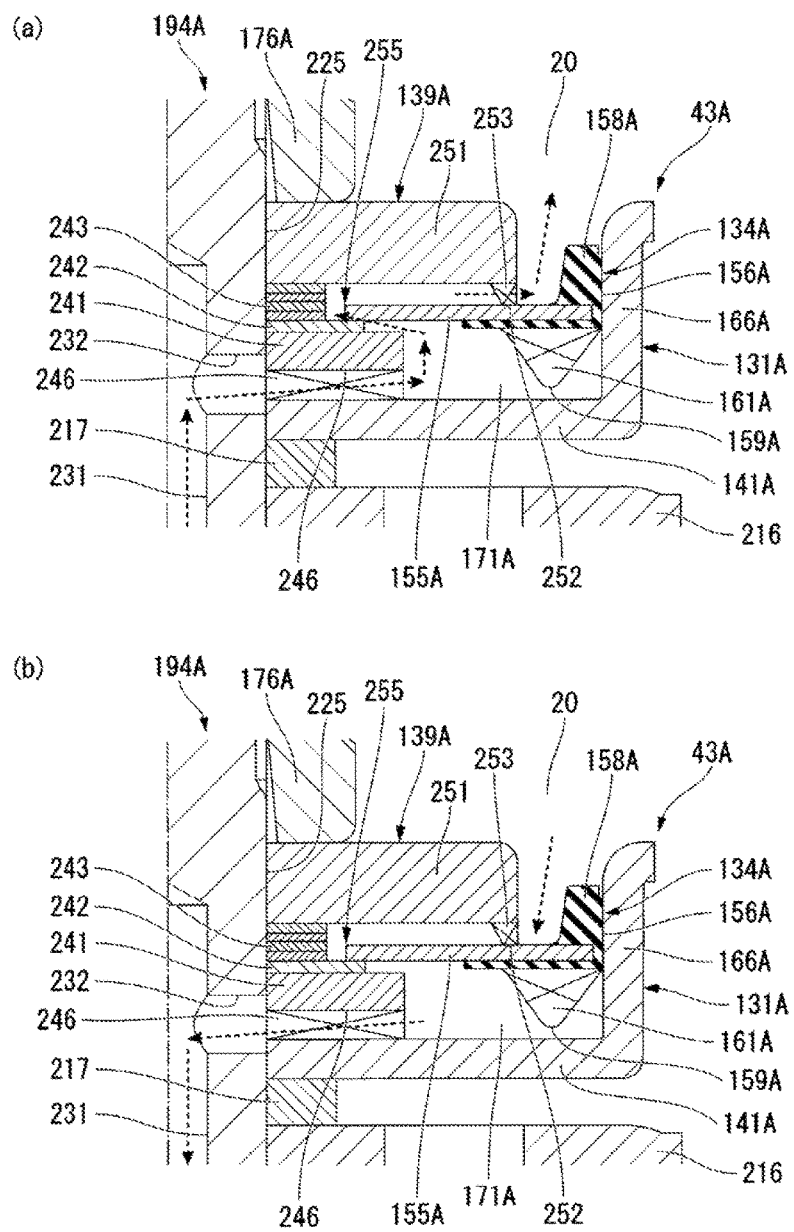
FIG. 6 is a partial cross-sectional view of a vicinity of the damping force variable mechanism that illustrates the shock absorber according to the second embodiment of the present invention.
Figure 7:
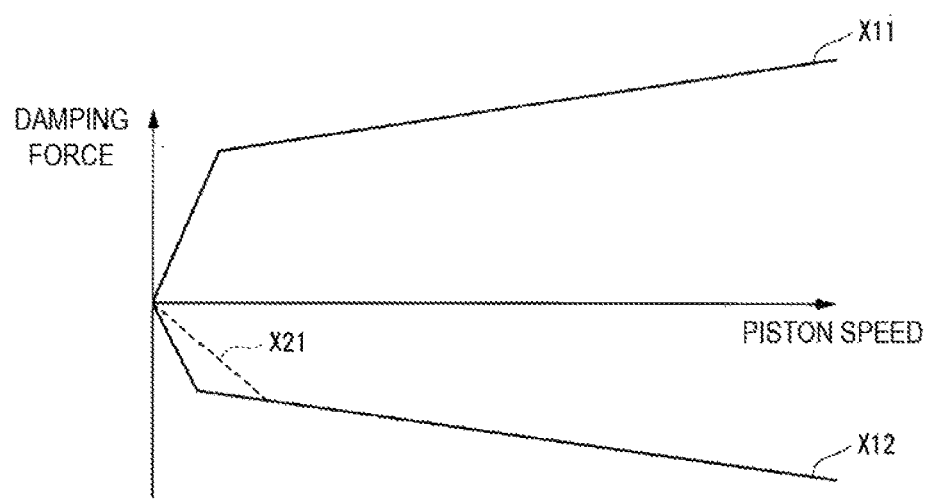
FIG. 7 illustrates a characteristic line conceptually indicating a relationship of the damping force with the piston speed of the shock absorber according to the second embodiment of the present invention.

Next, a second embodiment will be described focusing on differences from the first embodiment, mainly with reference to FIGS. 5 to 7. Portions in common with the first embodiment will be identified by the same names and the same reference numerals.

Figure 5:
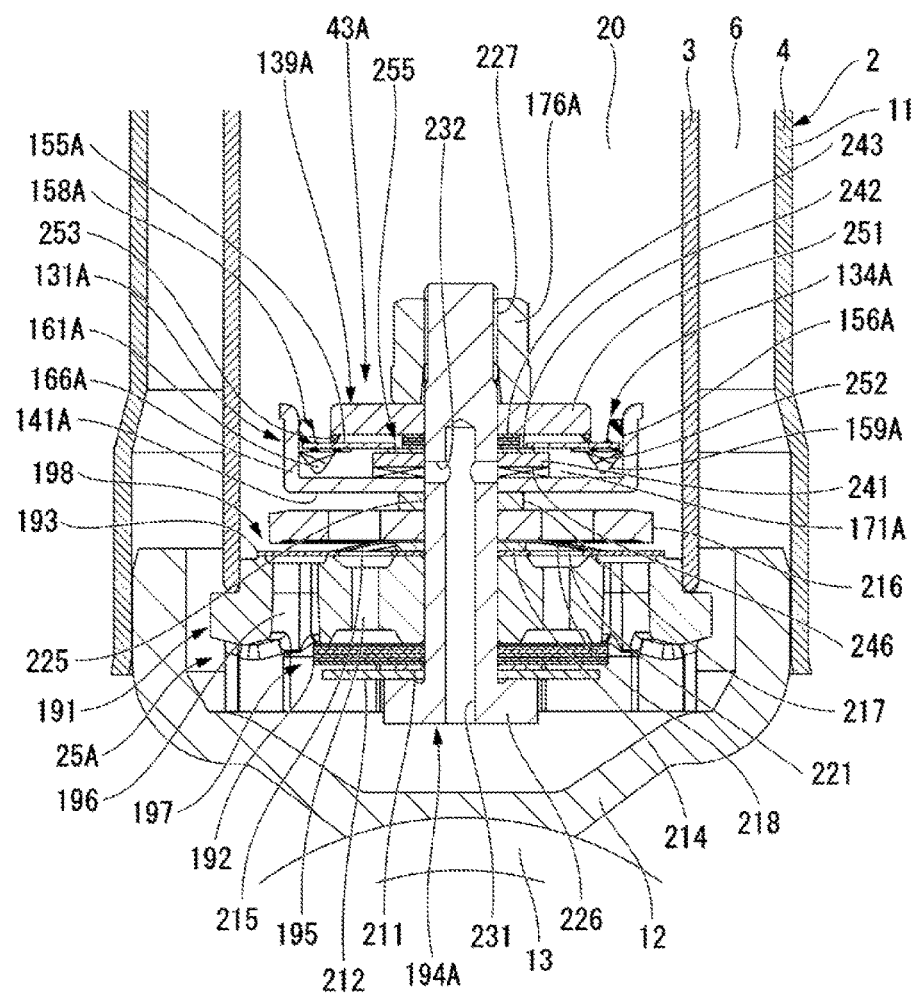
FIG. 5 is a partial cross-sectional view of a vicinity of a bottom valve and a damping force variable mechanism that illustrates a shock absorber according to a second embodiment of the present invention.

As illustrated in FIG. 5, in the second embodiment, a damping force variable mechanism 43A is provided on a bottom valve 25A partially different from the bottom valve 25. The bottom valve 25A includes the bottom valve member 191, the plurality of disks 192, and the single disk 193, any of which is similar to the first embodiment, and a pin member 194A partially different from the pin member 194. The plurality of disks 192 forms the damping force generation mechanism 197 together with the bottom valve member 191, and the single disk 193 forms the suction valve 198 together with the bottom valve member 191.

The bottom valve 25A includes a spacer 211 and a restriction disk 212. The spacer 211 is disposed on an opposite side of the plurality of disks 192 from the bottom valve member 191, and has an outer diameter smaller than outer diameters of the disks 192. The restriction disk 212 is disposed on an opposite side of the spacer 211 from the disks 192, and has an outer diameter larger than the outer diameter of the spacer 211 and slightly smaller than the outer diameters of the disks 192. Further, the bottom valve 25A includes a spacer 214, a spring member 215, a restriction disk 216, and a spacer 217. The spacer 214 is disposed on an opposite side of the disk 193 from the bottom valve member 191 and has an outer diameter smaller than the outer diameter of the disk 193. The spring member 215 is disposed on an opposite side of the spacer 214 from the disk 193. The restriction disk 216 is disposed on an opposite side of the spring member 215 from the spacer 214, and has an outer diameter larger than the outer diameter of the spacer 211 and slightly smaller than the outer diameter of the disk 193. The spacer 217 is disposed on an opposite side of the restriction disk 126 from the spring member 215, and has an outer diameter smaller than the outer diameter of the restriction disk 216.

The disk 193, which forms the suction valve 198, closes the passage hole 196 by abutting against the bottom valve member 191, and opens the passage hole 196 by being separated from the bottom valve member 191. The spring member 215 includes a plurality of spring portions 218 extending radially outward and inclined so as to further approach the disk 193 on a further radially outer side thereof. This plurality of spring portions 218 presses the disk 193 against the bottom valve member 191 with a slight biasing force. A through-hole 221 is formed through the suction valve 198. The through-hole 221 establishes constant communication of the passage holes 195 of the bottom valve member 191 with the lower chamber 20.

The plurality of disks 192, which forms the damping force generation mechanism 197, closes the passage holes 195 by abutting against the bottom valve member 191, and opens the passage holes 195 by being separated from the bottom valve member 191.

The pin member 194A includes an attachment shaft portion 225 and a flange portion 226. The flange portion 226 extends radially outward from one axial side of the attachment shaft portion 225. A male screw 227 is formed on an outer peripheral portion of the attachment shaft portion 225 on an axially opposite side from the flange portion 226. A passage hole 231 and a passage hole 232 are formed at the attachment shaft portion 225 on a radial center thereof. The passage hole 231 extends from one end portion on a flange portion 226 side in the axial direction to a position on the way to the other end side. The passage hole 232 penetrates through the attachment shaft portion 225 radially while intersecting the passage hole 231.

The damping force variable mechanism 43A includes a single bottomed cylindrical housing 131A, a single passage formation member 241, a single disk 242, a plurality of disks 243 and a single partition disk 134A (a disk), and a facing member 139A facing the partition disk 134A in this order from a bottom valve 25A side in the axial direction. The housing 131A, the passage formation member 241, the disks 242 and 243, and the facing member 139A are metallic. Both the disks 242 and 243 have holed circular plate-like shapes keeping constant thicknesses to which the attachment shaft portion 225 of the pin member 194A can be fitted inside them. All the passage formation member 241, the housing 131A, and the facing member 139A have annular shapes to which the attachment shaft portion 225 of the pin member 194A can be fitted inside them.

The facing member 139A includes a holed disk-like base portion 251 and an annular protruding portion 252. The protruding portion 252 protrudes from an outer peripheral portion of the base portion 251 toward one axial side. A plurality of cutouts 253 is formed on the protruding portion 252 partially circumferentially, and these cutouts 253 penetrate through the protruding portion 252 radially.

The housing 131A includes a holed disk-like bottom portion 141A and a cylindrical tubular portion 166A. The bottom portion 141A extends along the direction orthogonal to the axis. The tubular portion 166A axially extends from an outer peripheral edge portion of the bottom portion 141A.

The passage formation member 241 is placed on the bottom portion 141A of the housing 131A. A plurality of radially penetrating radial grooves 246 is formed on the passage formation member 241 on a bottom portion 141A side thereof. The disk 242 has an outer diameter smaller than an outer diameter of the passage formation member 241. The plurality of disks 243 has outer diameters smaller than the outer diameter of the disk 242.

The partition disk 134A includes a metallic disk 155A and a rubber seal member 156A fixedly attached to an outer peripheral side of the disk 155A, and is configured to be elastically deformable. The disk 155A has a holed circular plate-like shape keeping a constant thickness that can be disposed so as to be spaced apart from the plurality of disks 243 disposed inside the disk 155A, and has a thinner thickness than a sum of thicknesses of the plurality of disks 243. The disk 155A has an outer diameter larger than an outer diameter of the protruding portion 252 of the facing member 139A and smaller than an inner diameter of the tubular portion 166A of the housing 131A.

The protruding portion 252 of the facing member 139A protrudes toward the disk 155A of the partition disk 134A, and restricts a movement of the disk 155A more than that toward a facing member 139A side by abutting against the disk 155A. The protruding portion 252 supports an outer peripheral side of the partition disk 134A by an end portion thereof on a protruding distal side. Further, a radially inner side and a radially outer aide of the protruding portion 252 are in constant communication with each other via the cutouts 253.

The seal member 156A is annularly fixedly attached to an outer peripheral side of the disk 155A. The seal member 156A includes an annular seal portion 158A and an annular elastic portion 159A. The seal portion 158A protrudes from the disk 155A toward a facing member 139A side in the axial direction. The elastic portion 159A protrudes from the disk 155A toward an opposite side from the facing member 139A in the axial direction. The seal portion 158A has the smallest inner diameter at an end portion thereof on a disk 155A side, and this inner diameter is larger than the outer diameter of the protruding portion 252. Due to this configuration, the partition disk 134A allows the disk 155A thereof to abut against the protruding portion 252 of the facing member 139A. A radial groove 161A is formed through the elastic portion 159A. The radial groove 161A is opened on an opposite side from the disk 155A, and penetrates radially.

The disk 242 has an outer diameter larger than an inner diameter of the disk 155A of the partition disk 134A. Due to this configuration, an inner peripheral side of the partition disk 134A is supported between the disk 242 and the facing member 139A movably in a range of an axial length of the entire plurality of disks 243. In other words, the partition disk 134A is provided movably relative to the housing 131A and the facing member 139A that move integrally with the passage formation member 241 and the disks 242 and 243. Further, the annular seal portion 158A is provided on the partition disk 134A on the outer peripheral side thereof, which is a non-supported side. The seal portion 158A seals between an outer periphery of the partition disk 134A and an inner periphery of the housing 131A. The seal member 156A including the seal portion 158A is centered relative to the housing 131A by contacting the housing 131A. In other words, the inner peripheral side of the partition disk 134A has a simple support structure that is supported by the disk 242 only one surface side without being clamped from both surface sides. The seal portion 158A is provided on a protruding portion 252 side of the partition disk 134A in the axial direction, and axially overlaps this protruding portion 252.

The facing member 139A is provided so as to face the partition disk 134A on an opposite side of the partition disk 134A from the bottom portion 141A. The facing member 139A has a holed disk-like shape to which the attachment shaft portion 225 of the pin member 194A can be fitted inside it. The elastic portion 159A is provided on the opposite surface of the partition disk 134A from the surface where the seal portion 158A is provided, and thus is provided between the opposite surface of the partition disk 134A from the surface where the seal portion 158A is provided and the bottom portion 141A of the housing 131A.

The seal portion 158A of the partition disk 134A is in contact with an inner peripheral surface of the tubular portion 166A of the housing 131A over an entire circumference, thereby sealing a space between the partition disk 134A and the tubular portion 166A. The seal portion 158A constantly seals the space between the partition disk 134A and the tubular portion 166A even when the partition disk 134A is deformed relative to the housing 131A within an allowable range. The partition disk 134A is centered relative to the housing 131A as described above due to the contact of the seal portion 158A thereof with the tubular portion 166A over the entire circumference. The partition disk 134A defines a variable chamber 171A (a housing inner chamber) having a variable volume on a bottom portion 141A side in the housing 131A together with the housing 131A. An opposite surface of the partition disk 134A from the variable chamber 171A faces the lower chamber 20. The partition disk 134A forms the variable chamber 171A between the housing 131A and the bottom portion 141A. The variable chamber 171A is in constant communication with the reservoir chamber 6 via passages in the radial grooves 246 of the passage formation member 241, a passage in the passage hole 232 of the pin member 194A, and a passage in the passage hole 231.

The pin member 194A penetrates through the restriction disk 212, the spacer 211, the plurality of disks 192, the bottom valve member 191, the disk 193, the spacer 214, the spring member 215, the restriction disk 216, the spacer 217, the housing 131A, the passage formation member 241, the disk 242, the plurality of disks 243, and the facing member 139A stacked on the flange portion 226 in this order, with the attachment shaft portion 225 inserted inside each of them. At this time, the partition disk 134A is fitted inside the housing 131A and disposed between the disk 242 and the facing member 139A. In this state, the passage hole 232 of the pin member 194A is in communication with the plurality of radial grooves 246 of the passage formation member 241.

A nut 176A is threadably engaged with the male screw 227 of the attachment shaft portion 225 protruding beyond the facing member 139A of the pin member 194A with the parts disposed in this manner. In this state, the flange portion 226 of the pin member 194A and the nut 176A sandwich therebetween the inner peripheral side or a whole of each of the restriction disk 212, the spacer 211, the plurality of disks 192, the bottom valve member 191, the disk 193, the spacer 214, the spring member 215, the restriction disk 216, the spacer 217, the housing 131A, the passage formation member 241, the disk 242, the plurality of disks 243, and the facing member 139A, by which they are axially clamped. At this time, the inner peripheral side of the partition disk 134A is not axially clamped. The nut 176A is a general-purpose hexagonal nut. The pin member 194A is inserted on inner peripheral sides of the housing 131A and the facing member 139A, and fastens the inner peripheral sides of the housing 131A and the facing member 139A. In the present embodiment, the nut 176A is the general-purpose hexagonal nut, but may have a surface other than six sides and/or may be realized with use of a dedicated nut. Further, the attachment shaft portion 225 protruding beyond the facing member 139A of the pin member 194A may be fixed by being swaged instead of being fastened with use of the nut 176.

In the above-described manner, in the second embodiment, the damping force variable mechanism 43A, which is formed by the housing 131A, the passage formation member 241, the disks 242 and 243, the facing member 139A, and the partition disk 134A, is provided on the bottom valve 25A.

The partition disk 134A is configured to be deformable within a range in which the inner peripheral side thereof moves between the disk 242 and the base portion 251 of the facing member 139A and the outer peripheral side thereof moves between the protruding portion 252 and the bottom portion 141A of the housing 131A. Now, a shortest axial distance between the protruding portion 252 supporting the outer peripheral side of the disk 155A of the partition disk 134A from one axial side and the disk 242 supporting the inner peripheral side of the disk 155A from the other axial side is shorter than an axial thickness of the disk 155A. Therefore, when the pressures in the variable chamber 171A and the lower chamber 20 match each other, the disk 155A is in pressure contact with the protruding portion 252 and the disk 242 over an entire circumference in a slightly deformed state due to an elastic force of the disk 155A itself. The partition disk 134A blocks the flow of the oil fluid between the variable chamber 171A and the lower chamber 20 with the inner peripheral side thereof in contact with the disk 242 over the entire circumference. Further, the partition disk 134A permits the flow of the oil fluid between the variable chamber 171A and the lower chamber 20 with the inner peripheral side thereof separated from the disk 242.

Therefore, the inner peripheral side of the partition disk 134A and the disk 242 form a check valve 255 that restricts the flow of the oil fluid from the lower chamber 20 to the variable chamber 171A while permitting the flow of the oil fluid from the variable chamber 171A to the lower chamber 20. The check valve 255 is a free valve in which the entire partition disk 134A serving as a valve body thereof is axially movable.

When the pressure in the lower chamber 20 falls below the pressure in the reservoir chamber 6 (the atmospheric pressure) during the extension stroke, this pressure is applied to the partition disk 134A. Then, the inner peripheral side of the disk 155A of the partition disk 134A is separated from the disk 242, and the check valve 255 is opened. As a result, the oil fluid in the reservoir chamber 6 flows into the lower chamber 20 by passing through a passage in the passage hole 231, a passage in the passage hole 232, passages in the radial grooves 246, the variable chamber 171A, a passage between the disk 155A of the opened check valve 255 and the disk 242, a passage between the base portion 251 of the facing member 139A and the disk 155A, and a passage in the cutout 253 (refer to dashed arrows illustrated in FIG. 6(a)).

As illustrated in FIG. 5, because the variable chamber 171A and the reservoir chamber 6 are in communication with each other via the passages in the radial grooves 246, the passage in the passage hole 232, and the passage in the passage hole 231, when the pressure in the lower chamber 20 exceeds the pressure in the reservoir chamber 6 during the compression stroke at the high frequency such as the Impact shock, the partition disk 134A is deformed toward the bottom portion 141A side to thus reduce the volume of the variable chamber while causing the oil fluid in the variable chamber 171A to flow into the reservoir chamber 6 (refer to dashed arrows illustrated in FIG. 6(b)). Then, the volume of the lower chamber 20 increases according thereto. As a result, a soft damping force is generated compared to the first embodiment indicated by a solid line X12, as indicated by a broken line X21 in FIG. 7.

According to the second embodiment, the damping force variable mechanism 43A including the housing 131A is integrally provided on the bottom valve 25A. Therefore, the second embodiment allows the shock absorber 1 to have a shorter axial length compared to the structure disclosed in the conventional art document.

The elastic portion 159A is provided between the opposite side of the partition disk 134A from the surface where the seal portion 158A is provided, and the bottom portion 141A of the housing 131A, and therefore the second embodiment can prevent or reduce noise generated due to a contact of the partition disk 134A with the bottom portion 141A of the housing 131A. Further, the elastic portion 159A is elastically deformable, and therefore the second embodiment smooths the deformation of the partition disk 134A, thus smoothing the frequency variable characteristic.

[Third Embodiment]

Figure 8:
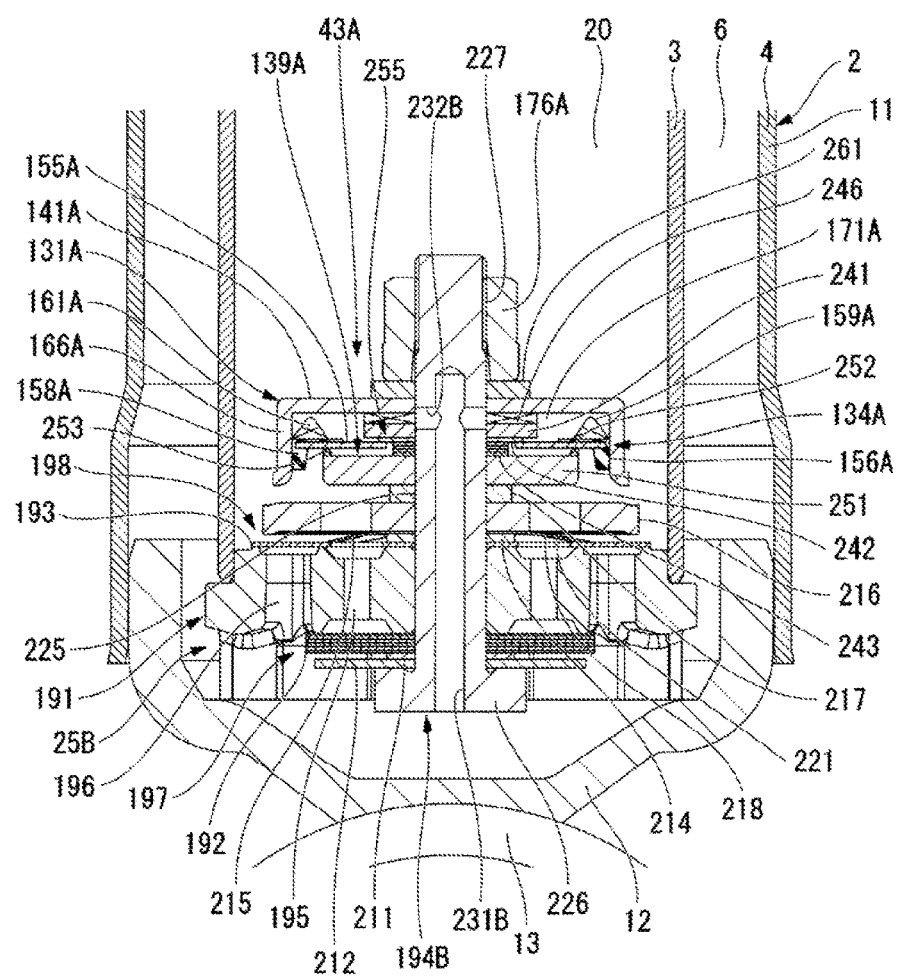
FIG. 8 is a partial cross-sectional view of a vicinity of a damping force variable mechanism that illustrates a shock absorber according to a third embodiment of the present invention.

Next, a third embodiment will be described focusing on differences from the second embodiment, mainly with reference to FIG. 8. Portions in common with the second embodiment will be identified by the same names and the same reference numerals.

In the third embodiment, the shock absorber 1 includes a bottom valve 25B different from the bottom valve 25 in terms of including a pin member 194B partially different from the pin member 194A. The damping force variable mechanism 43A is attached to the bottom valve 25B in a state inverted from the second embodiment. The pin member 194B includes a passage hole 231B formed through the attachment shaft portion 225. The passage hole 231B has a depth deeper than the passage hole 231. Then, a passage hole 232B is formed at a position farther away from the flange portion 226 than the passage hole 232 is while intersecting the passage hole 231B.

The pin member 194B penetrates through the restriction disk 212, the spacer 211, the plurality of disks 192, the bottom valve member 191, the disk 193, the spacer 214, the spring member 215, the restriction disk 216, the spacer 217, the facing member 139A, the plurality of disks 243, the disk 242, the passage formation member 241, the housing 131A, and a washer 261 stacked on the flange portion 226 in this order, with the attachment shaft portion 225 inserted inside each of them. At this time, the partition disk 134A is fitted inside the housing 131A and disposed between the disk 242 and the facing member 139A. In this state, the passage hole 232B is in communication with the plurality of radial grooves 246 of the passage formation member 241.

The nut 176A is threadably engaged with the male screw 227 of the attachment shaft portion 225 protruding beyond the washer 261 of the pin member 194B with the parts disposed in this manner. In this state, the flange portion 226 of the pin member 1943 and the nut 176A sandwich therebetween the inner peripheral side or the whole of each of the restriction disk 212, the spacer 211, the plurality of disks 192, the bottom valve member 191, the disk 193, the spacer 214, the spring member 215, the restriction disk 216, the spacer 217, the facing member 139A, the plurality of disks 243, the disk 242, the passage formation member 241, the housing 131A, and the washer 261, by which they are axially clamped. At this time, the inner peripheral side of the partition disk 134A is not axially clamped. The pin member 194B is also inserted on the inner peripheral sides of the housing 131A and the facing member 139A, and fastens the inner peripheral sides of the housing 131A and the facing member 139A, similarly to the second embodiment. The passage in the passage hole 231B, the passage in the passage hole 232B, and the passages in the radial grooves 246 establish constant communication of the reservoir chamber 6 with the variable chamber 171A.

The third embodiment also operates in a similar manner to the second embodiment.

[Fourth Embodiment]

Figure 9:
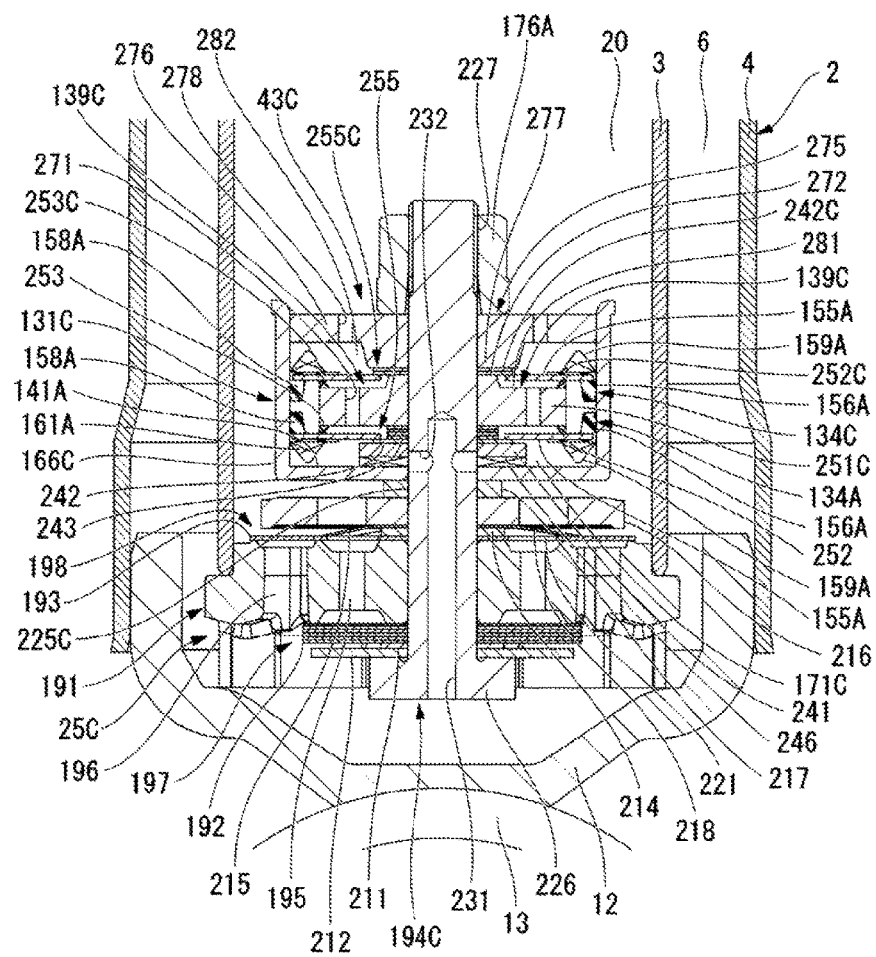
FIG. 9 is a partial cross-sectional view of a vicinity of a damping force variable mechanism that illustrates a shock absorber according to a fourth embodiment of the present invention.

Next, a fourth embodiment will be described focusing on differences from the second embodiment, mainly with reference to FIG. 9. Portions in common with the second embodiment will be identified by the same names and the same reference numerals.

In the fourth embodiment, the shock absorber 1 includes a bottom valve 25C different from the bottom valve 25A in terms of including a pin member 194C partially different from the pin member 194A. The pin member 194C includes an attachment shaft portion 225C axially longer than the pin member 194A.

Further, in the fourth embodiment, the shock absorber 1 includes a damping force variable mechanism 43C partially different from the damping force variable mechanism 43A. The damping force variable mechanism 43C includes a housing 131C including a cylindrical tubular portion 166C. The cylindrical tubular portion 166C axially extends from an outer peripheral edge portion of the bottom portion 141A similar to the second embodiment by a longer length than the tubular portion 166A. Further, the damping force variable mechanism 43C includes the passage formation member 241, the disk 242, the plurality of disks 243, and the partition disk 134A, any of which is similar to the second embodiment, and includes a facing member 139C partially different from the facing member 139A.

The facing member 139C includes a holed disk-like base portion 251C, the annular protruding portion 252 similar to the second embodiment, and an annular protruding portion 252C. The protruding portion 252 protrudes from an outer peripheral portion of the base portion 251C toward one axial side. The protruding portion 252C protrudes from the outer peripheral portion of the base portion 251C toward the other axial side. The plurality of cutouts 253 similar to the second embodiment is formed on the protruding portion 252. A plurality of cutouts 253C is also formed on the protruding portion 252C circumferentially partially. These cutouts 253C penetrate the protruding portion 252C radially. A plurality of axially penetrating through-holes 271 is formed through the base portion 251C on a radially inner side with respect to the protruding portions 252 and 252C. A boss portion 272 is provided on a radially inner side of the base portion 251C with respect to the through-holes 271. The boss portion 272 protrudes from the base portion 251C toward the same side as the protruding portion 252C.

The damping force variable mechanism 43C includes a plurality of disks 242C, a cover member 275, and a partition disk 134C similar to the partition disk 134A. The cover member 275 includes a holed disk-like base portion 276 and an annular boss portion 277. The boss portion 277 protrudes from an inner peripheral portion of the base portion 276 toward one axial side. A plurality of axially penetrating through-holes 278 is formed through the base portion 276. The cover member 275 is integrated with the housing 131C by being fitted to the tubular portion 166C with the boss portion 277 protruding beyond the base portion 276 toward the bottom portion 141A side.

The protruding portion 252 of the facing member 139C protrudes toward the disk 155A of the partition disk 134A, and restricts a movement of the disk 155A more than that toward a facing member 139C side by abutting against the disk 155A.

The protruding portion 252C of the facing member 139C protrudes toward the disk 155A of the partition disk 134C, and restricts a movement of the disk 155A more than that toward the facing member 139C side by abutting against the disk 155A. The protruding portion 252C supports an outer peripheral side of the partition disk 134C by an end portion of a protruding distal side thereof. Further, a radially inner side and a radially outer side of the protruding portion 252C are in constant communication with each other via the cutouts 253C.

The seal portion 158A of the seal member 156A of the partition disk 134C has the smallest inner diameter at an end portion thereof on a disk 155A side, and this inner diameter is slightly larger than an outer diameter of the protruding portion 252C. Due to this configuration, the partition disk 134C allows the disk 155A thereof to abut against the protruding portion 252C of the facing member 139C.

The disk 242C has an outer diameter larger than an inner diameter of the disk 155A of the partition disk 134C. Due to this configuration, an inner peripheral side of the partition disk 134C is supported between the disk 242C and the base portion 251C of the facing member 139C movably in a range of an axial length of the boss portion 272. In other words, the partition disk 134C is provided movably relative to the housing 131C and the cover member 275 that move integrally with the passage formation member 241, the disks 242C and 243, and the facing member 139C. Further, the annular seal portion 158A is provided on the partition disk 134C on an outer peripheral side thereof, which is a non-supported side. The seal portion 156A seals between an outer periphery of the partition disk 134C and the inner periphery of the housing 131C. The seal member 156A including the seal portion 158A is centered relative to the housing 131C by contacting the housing 131C. In other words, the inner peripheral side of the partition disk 134C has a simple support structure that is supported by the disk 242C on only one surface side without being clamped from both surface sides. The seal portion 158A of the partition disk 134C is provided on a protruding portion 252C side of the partition disk 134C in the axial direction, and axially overlaps this protruding portion 252C.

The seal portion 158A of the partition disk 134A is in contact with the inner peripheral surface of the tubular portion 166C of the housing 131C over an entire circumference, thereby sealing the space between the partition disk 134A and the tubular portion 166C. The seal portion 158A of the partition disk 134C is also in contact with the inner peripheral surface of the tubular portion 166C of the housing 131C over the entire circumference, thereby sealing a space between the partition disk 134C and the tubular portion 166C. The partition disk 134A defines a variable chamber 171C (a housing inner chamber) having a variable volume on a bottom portion 141A side in the housing 131C together with the housing 131C. The variable chamber 171C is in constant communication with the reservoir chamber 6 via the passages in the radial grooves 246 of the passage formation member 241, the passage in the passage hole 232 of the pin member 194C, and the passage in the passage hole 231.

The partition disks 134A and 134C define a variable chamber 281 having a variable volume therebetween together with the housing 131C. The partition disk 134C and the cover member 275 define a variable chamber 282 having a variable volume therebetween together with the housing 131C. This variable chamber 282 is in constant communication with the lower chamber 20 via the through-holes 278.

The pin member 194C penetrates through the restriction disk 212, the spacer 211, the plurality of disks 192, the bottom valve member 191, the disk 193, the spacer 214, the spring member 215, the restriction disk 216, the spacer 217, the housing 131C, the passage formation member 241, the disk 242, the plurality of disks 243, the facing member 139C, the plurality of disks 242C, and the cover member 275 stacked on the flange portion 226 in this order, with the attachment shaft portion 225C inserted inside each of them. At this time, the partition disk 134A is fitted inside the housing 131C and disposed between the disk 242 and the facing member 139C, and the partition disk 134C is fitted inside the housing 131C and disposed between the facing member 139C and the disk 242C. In this state, the passage hole 232 is in communication with the plurality of radial grooves 246 of the passage formation member 241. The cover member 275 is fitted to the tubular portion 166C of the housing 131C.

The nut 176A is threadably engaged with the male screw 227 of the attachment shaft portion 225C protruding beyond the cover member 275 of the pin member 194C with the parts disposed in this manner. In this state, the flange portion 226 of the pin member 194C and the nut 176A sandwich therebetween the inner peripheral side or the whole of each of the restriction disk 212, the spacer 211, the plurality of disks 192, the bottom valve member 191, the disk 193, the spacer 214, the spring member 215, the restriction disk 216, the spacer 217, the housing 131C, the passage formation member 241, the disk 242, the plurality of disks 243, the facing member 139C, the plurality of disks 242C, and the cover member 275, by which they are axially clamped. At this time, any of the inner peripheral sides of the partition disks 134A and 134C is not axially clamped. The pin member 194C is inserted on inner peripheral sides of the housing 131C and the facing member 139C, and fastens the inner peripheral sides of the housing 131C and the facing member 139C.

In the above-described manner, in the fourth embodiment, the damping force variable mechanism 43C, which is formed by the housing 131C, the facing member 139C, the cover member 275, the passage formation member 241, the disks 242, 242C, and 243, the facing member 139C, and the partition disks 134A and 134C, is provided on the bottom valve 25C.

The partition disk 134A is configured to be deformable within the range in which the inner peripheral side thereof moves between the disk 242 and the facing member 139C and the outer peripheral side thereof moves between the protruding portion 252 and the bottom portion 141A of the housing 131C. Now, a shortest axial distance between the protruding portion 252 supporting the outer peripheral side of the disk 155A of the partition disk 134A from one axial side and the disk 242 supporting the inner peripheral side of the disk 155A of the partition disk 134A from the other axial side is shorter than the axial thickness of the disk 155A of the partition disk 134A. Therefore, when the pressures in the variable chamber 171C and the variable chamber 281 match each other, the disk 155A of the partition disk 134A is in pressure contact with the protruding portion 252 and the disk 242 over the entire circumference in the slightly deformed state due to the elastic force of the disk 155A itself.

The partition disk 134 blocks the flow of the oil fluid between the variable chamber 171C and the variable chamber 281 with the inner peripheral side thereof in contact with the disk 242 over the entire circumference. Further, the partition disk 134A permits the flow of the oil fluid between the variable chamber 171C and the variable chamber 261 with the inner peripheral side thereof separated from the disk 242. Therefore, the inner peripheral side of the partition disk 134A and the disk 242 form the check valve 255 that restricts the flow of the oil fluid from the variable chamber 281 to the variable chamber 171C while permitting the flow of the oil fluid from the variable chamber 171C to the variable chamber 281.

The partition disk 134C is configured to be deformable within a range in which the inner peripheral side thereof moves between the disk 242C and the base portion 251C of the facing member 139C and the outer peripheral side thereof moves between the protruding portion 252C and the base portion 276 of the cover member 275. Now, a shortest axial distance between the protruding portion 252C supporting the outer peripheral side of the disk 155A of the partition disk 134C from one axial side and the disk 242C supporting the inner peripheral side of the disk 155A of the partition disk 134C from the other axial side is shorter than an axial thickness of the disk 155A of the partition disk 134C. Therefore, when the pressures in the variable chamber 281 and the variable chamber 282 match each other, the disk 155A of the partition disk 134C is in pressure contact with the protruding portion 252C and the disk 242C over an entire circumference in a slightly deformed state due to an elastic force of the disk 155A itself.

The partition disk 134C blocks the flow of the oil fluid between the variable chamber 281 and the variable chamber 282 with the inner peripheral side thereof in contact with the disk 242C over the entire circumference. Further, the partition disk 134C permits the flow of the oil fluid between the variable chamber 281 and the variable chamber 282 with the inner peripheral side thereof separated from the disk 242C. Therefore, the inner peripheral side of the partition disk 134C and the disk 242C form a check valve 255C that restricts the flow of the oil fluid from the variable chamber 281 to the lower chamber 20 via the variable chamber 282 while permitting the flow of the oil fluid from the lower chamber 20 to the variable chamber 281 via the variable chamber 282.

When the pressure in the variable chamber 281 falls below the pressure in the variable chamber 171C, the inner peripheral side of the disk 155A of the partition disk 134A forming the check valve 255 is separated from the disk 242, and the oil fluid in the reservoir chamber 6 flows into the variable chamber 281 by passing through the passage in the passage hole 231, the passage in the passage hole 232, the passages in the radial groove 246, the variable chamber 171C, the passage between the disk 155A of the check valve 255 in the opened state and the disk 242, the passage between the facing member 139C and the disk 155A of the partition disk 134A, and the passages in the cutouts 253. When the pressure in the lower chamber 20 reduces during the extension stroke, the pressure in the variable chamber 282 in communication with the lower chamber 20 via the through-holes 278 of the cover member 275 also reduces and this pressure is applied to the partition disk 134C. Then, the partition disk 134C is deformed toward a cover member 275 side while causing the oil fluid in the reservoir chamber 6 to flow into the variable chamber 281 according to the above-described flow, thereby causing the oil fluid in the variable chamber 282 to flow into the lower chamber 20. As a result, a soft damping force is generated.

During the compression stroke, the pressure in the lower chamber 20 increases, and the pressure in the variable chamber 282 in communication with the lower chamber 20 via the through-holes 278 of the cover member 275 also increases. When the pressure in the variable camber 282 exceeds the pressure in the variable chamber 281, the inner peripheral side of the disk 155A forming the check valve 255C is separated from the disk 242C to cause the oil fluid in the variable chamber 282 to flow into the variable chamber 281, thereby leading to an increase in the pressure in the variable chamber 281. Since the variable chamber 171C is in communication with the reservoir chamber 6, the partition disk 134A is deformed toward the bottom portion 141A side while causing the oil fluid in the variable chamber 171C to flow into the reservoir chamber 6 due to the increase in the pressure in the variable chamber 281, thereby increasing the volume of the variable chamber 282. Due to this operation, the volume of the variable chamber 171C reduces, and the volume of the variable chamber 281 in communication with the lower chamber 20 side increases according thereto. As a result, a soft damping force is generated.

In the first embodiment, the shock absorber 1 may be configured to support the outer peripheral side of the partition disk 134 by the housing 131 integrated with the piston rod 21, and include an annular seal member that seals a space with the piston rod 21 side on the inner peripheral side of the partition disk 134, which is the non-supported side. Similarly, in the second and/or third embodiment(s), the shock absorber 1 may be configured to support the outer peripheral side of the partition disk 134A by the housing 131A integrated with the pin member 194A or 194B, and include an annular seal member that seals a space with the pin member 194A or 194B side on the inner peripheral side of the partition disk 134A, which is the non-supported side. Similarly, in the fourth embodiment, the shock absorber 1 may be configured to support the outer peripheral side(s) of the partition disk(s) 134A and/or 134C by the housing 131C integrated with the pin member 194C, and include an annular seal member that seals a space with the pin member 194C side on the inner peripheral side(s) of the partition disk(s) 134A and/or 134C, which is the non-supported side.

The above-described embodiments has been described based on the example in which the present invention is employed for the twin-tube hydraulic shock absorber. However, the applicability of the present invention is not limited thereto, and the present invention may be employed for a mono-tube hydraulic shock absorber that omits the outer tube and forms a gas chamber with use of a slidable partition member on the opposite side of the lower chamber 20 from the upper chamber 19 in the cylinder 2, and can be employed for any type of shock absorber. Further, the present invention can also be applied to when an oil passage in communication with the inside of the cylinder 2 is provided outside the cylinder 2 and the damping force generation mechanism is provided in this oil passage.

The above-described embodiments have been described based on the example in which the shock absorber is configured to include the elastic portion between the opposite side of the disk from the surface where the seal portion is provided and the facing member or the bottom portion of the housing, and the elastic portion is provided integrally with the disk. However, the present invention is not limited thereto, and, for example, the elastic portion may be provided by being attached to the facing member. Alternatively, the elastic portion may be omitted.

In the above-described embodiments, the shock absorber includes the cylinder sealingly containing the hydraulic fluid therein, the piston slidably and fittedly inserted inside the cylinder and defining the rod-side chamber and the bottom-side chamber in the cylinder, the piston rod having the one end side fixed to the piston in the cylinder and the other end side protruding out of the cylinder via the rod guide, the damping force generation mechanism configured to generate the damping force by the movement of the piston, the bottomed cylindrical housing, the disk provided movably relative to the housing and forming the housing inner chamber between the bottom portion of the housing and the disk, and the facing member provided on the opposite side of the disk from the bottom portion so as to face the disk. The inner periphery sides of the housing and the facing member are fastened with the pin member inserted therethrough. The protruding portion is formed on the bottom portion of the housing or the facing member. The protruding portion protrudes toward the disk and is configured to restrict the movement of the disk. The seal portion is provided on the protruding portion side of the disk. The seal portion is configured to seal between the outer periphery of the disk and the inner periphery of the housing. The seal portion of the disk, which seals between the outer periphery and the inner periphery of the disk, is provided on the protruding portion side, which protrudes from the bottom portion of the housing toward the disk and restricts the movement of the disk. Therefore, this configuration allows the shock absorber to have a shorter axial length and a smaller size.

Further, the housing is provided on the piston. Therefore, this configuration allows the shock absorber to have a shorter axial entire length of the parts that integrally move with the piston and the piston rod.

Further, the cylinder includes the inner tube and the outer tube on the outer peripheral side of the inner tube. The bottom valve is provided between the inner tube and the outer tube, and the housing is provided on the bottom valve. Therefore, this configuration allows the shock absorber to have a further shorter axial entire length of the parts that integrally move with the piston and the piston rod.

The elastic portion is provided between the opposite side of the disk from the surface of the disk where the seal portion is provided, and the facing member or the bottom portion of the housing. Therefore, this configuration can prevent or reduce the noise generated due to the contact of the disk with the facing member or the bottom portion of the housing.

Further, the pin member is the one end side of the piston rod.

Further, the annular space is formed between the disk and the housing, and the seal portion is provided so as to be fixedly attached to the both surfaces of the disk via the space.

A first aspect of the shock absorber includes a cylinder sealingly containing hydraulic fluid therein, a piston slidably and fittedly inserted inside the cylinder and defining a rod-side chamber and a bottom-side chamber in the cylinder, a piston rod having one end side fixed to the piston in the cylinder and the other end side protruding out of the cylinder via a rod guide, a damping force generation mechanism configured to generate a damping force by a movement of the piston, a bottomed cylindrical housing, a disk provided movably relative to the housing and forming a housing inner chamber between a bottom portion of the housing and the disk, and a facing member provided on an opposite side of the disk from the bottom portion so as to face the disk. Inner periphery sides of the housing and the facing member are fastened with a pin member inserted therethrough. A protruding portion is formed on the bottom portion of the housing or the facing member. The protruding portion protrudes toward the disk and is configured to restrict a movement of the disk. A seal portion is provided on one side of the disk where the protruding portion is provided. The seal portion is configured to seal between an outer periphery of the disk and an inner periphery of the housing.

According to a second aspect of the shock absorber, in the first aspect, the housing is provided on the piston.

According to a third aspect of the shock absorber, in the first or second aspect, the cylinder includes an inner tube and an outer tube on an outer peripheral side of the inner tube. A bottom valve is provided between the inner tube and the outer tube, and the housing is provided on the bottom valve.

According to a fourth aspect of the shock absorber, in any of the first to third aspects, an elastic portion is provided between an opposite side of the disk from a surface of the disk where the seal portion is provided, and the facing member or the bottom portion of the housing.

According to a fifth aspect of the shock absorber, in the first aspect, the pin member is the one end side of the piston rod.

According to a sixth aspect of the shock absorber, in the first to fifth aspects, an annular space is formed between the disk and the housing, and the seal portion is provided so as to be fixedly attached to the both surfaces of the disk via the space.

Having described merely several embodiments of the present invention, those skilled in the art will be able to easily appreciate that the embodiments described as the examples can be modified or improved in various manners without substantially departing from the novel teachings and advantages of the present invention. Therefore, such modified or improved embodiments are intended to be also contained in the technical scope of the present invention. The above-described embodiments may also be arbitrarily combined.

Further, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2015-191065 filed on Sep. 14, 2015. The entire disclosure of Japanese Patent Application No. 2015-181065 filed on Sep. 14, 2015 including the specification, the claims, the drawings, and the abstract is incorporated herein by reference in its entirety.

The entire disclosure of Japanese Patent Public Disclosure No. 2011-247371 including the specification, the claims, the drawings, and the abstract is incorporated herein by reference in its entirety.

REFERENCE SIGN LIST 1 shock absorber
2 cylinder
3 inner tube
4 outer tube
18 piston
19 upper chamber (rod-side chamber)
20 lower chamber (bottom-side chamber)
21 piston rod (pin member)
25A, 25B, 25C bottom valve
41, 42, 197 damping force generation mechanism
131, 131A, 131C housing
134, 134A, 134C partition disk (disk)
139, 139A, 139C facing member
143, 252, 252C protruding portion
158, 158A seal member
159, 159A elastic portion
171, 171A, 171C variable chamber (housing inner chamber)
194A, 194B, 194C pin member

The invention claimed is:

1. A shock absorber comprising:
a cylinder sealingly containing hydraulic fluid therein;
a piston slidably and fittedly inserted inside the cylinder and defining a rod-side chamber and a bottom-side chamber in the cylinder;
a piston rod including one end side portion fixed to the piston in the cylinder and an opposite end side portion protruding out of the cylinder via a rod guide;
a damping force generation mechanism configured to generate a damping force by a movement of the piston;
a bottomed cylindrical housing;
a disk provided movably relative to the housing and forming a housing inner chamber between a bottom portion of the housing and the disk; and
an annular facing member provided on an opposite side of the disk from the bottom portion so as to face the disk,
wherein inner peripheries of the housing and the facing member are fastened with a pin member inserted therethrough,
wherein a protruding portion is formed on the bottom portion of the housing or the facing member, the protruding portion protruding toward the disk and being configured to restrict a movement of the disk,
wherein a seal portion is provided on a protruding portion of the disk, the seal portion being configured to seal between an outer periphery of the disk and the inner periphery of the housing,
wherein an elastic portion is provided between an opposite surface of the disk from a surface of the disk where the seal portion is provided, and the facing member or the bottom portion of the housing.

2. A shock absorber comprising:
a cylinder sealingly containing hydraulic fluid therein;
a piston slidably and fittedly inserted inside the cylinder and defining a rod-side chamber and a bottom-side chamber in the cylinder;
a piston rod including one end side portion fixed to the piston in the cylinder and an opposite end side portion protruding out of the cylinder via a rod guide;
a damping force generation mechanism configured to generate a damping force by a movement of the piston;
a bottomed cylindrical housing;
a disk provided movably relative to the housing and forming a housing inner chamber between a bottom portion of the housing and the disk; and
an annular facing member provided on an opposite side of the disk from the bottom portion so as to face the disk,
wherein inner peripheries of the housing and the facing member are fastened with a pin member inserted therethrough,
wherein a protruding portion is formed on the bottom portion of the housing or the facing member, the protruding portion protruding toward the disk and being configured to restrict a movement of the disk,
wherein a seal portion is provided on a protruding portion of the disk, the seal portion being configured to seal between an outer periphery of the disk and the inner periphery of the housing,
wherein an annular space is formed between the disk and the housing, and the seal portion is provided so as to be fixedly attached to the both surfaces of the disk via the space.

3. The shock absorber according to claim 1, wherein the housing is provided on the piston.

4. The shock absorber according to claim 1, wherein the cylinder includes an inner tube and an outer tube on an outer peripheral side of the inner tube, and
wherein a bottom valve is provided between the inner tube and the outer tube, and the housing is provided on the bottom valve.

5. The shock absorber according to claim 1, wherein the pin member is the one end side portion of the piston rod.

6. The shock absorber according to claim 2, wherein the housing is provided on the piston.

7. The shock absorber according to claim 2, wherein the cylinder includes an inner tube and an outer tube on an outer peripheral side of the inner tube, and wherein a bottom valve is provided between the inner tube and the outer tube, and the housing is provided on the bottom valve.

8. The shock absorber according to claim 2, wherein the pin member is the one end side portion of the piston rod.

* * * * *